US012712678B2

(12) United States Patent
Loehr et al.

(10) Patent No.: US 12,712,678 B2
(45) Date of Patent: Aug. 18, 2026

(54) AUTONOMOUSLY TRIGGERING RETRANSMISSION OF DATA

(71) Applicant: Lenovo (Singapore) PTE. LTD., New Tech Park (SG)

(72) Inventors: Joachim Loehr, Wiesbaden (DE); Ravi Kuchibhotla, Clarendon Hills, IL (US); Karthikeyan Ganesan, Kaiserslautern (DE)

(73) Assignee: Lenovo (Singapore) Pte. Ltd., Singapore (SG)

(*) Notice: Subject to any disclaimer, the term of this patent is extended or adjusted under 35 U.S.C. 154(b) by 0 days.

(21) Appl. No.: 16/799,624

(22) Filed: Feb. 24, 2020

(65) Prior Publication Data

US 2020/0274654 A1 Aug. 27, 2020

Related U.S. Application Data

(60) Provisional application No. 62/809,483, filed on Feb. 22, 2019.

(51) Int. Cl.
*H04W 72/1268* (2023.01)
*H04L 1/1829* (2023.01)
(Continued)

(52) U.S. Cl.
CPC ....... *H04L 1/1861* (2013.01); *H04W 72/1268* (2013.01); *H04W 72/23* (2023.01); *H04W 72/566* (2023.01)

(58) Field of Classification Search
CPC ... H04L 1/1822; H04L 1/1861; H04L 1/1887; H04L 5/0064; H04L 1/1812; H04L 43/16;
(Continued)

(56) References Cited

U.S. PATENT DOCUMENTS

2010/0037105 A1* 2/2010 Bourlas ................. H04L 1/1854 714/57
2010/0115367 A1* 5/2010 Hsu ....................... H04L 1/1887 714/748
(Continued)

FOREIGN PATENT DOCUMENTS

EP 3399724 B1 10/2022
WO WO-2017193376 A1 * 11/2017 ........... H04L 1/1854
WO WO-2018123950 A1 * 7/2018 ............ H04W 72/02

OTHER PUBLICATIONS

3GPP, "3rd Generation Partnership Project; Technical Specification Group Radio Access Network; NR; Radio Link Control (RLC) protocol specification (Release 15)", 3GPP TS 38.322 V15.4.0, Dec. 2018, pp. 1-33.
(Continued)

*Primary Examiner* — Yee F Lam
(74) *Attorney, Agent, or Firm* — Kunzler Needham Hilton

(57) ABSTRACT

Apparatuses, methods, and systems are disclosed for autonomous packet duplication and retransmission. One apparatus includes a processor that generates a first PDU for a first uplink grant associated with a first HARQ process and generates a second MAC PDU for a second uplink grant associated with a second HARQ process. Here, the first uplink grant is a configured grant, the second uplink grant has overlapping PUSCH resources with the first uplink grant, and the second uplink grant has a higher priority than the first uplink grant. The apparatus includes a transceiver that transmits the second MAC PDU according to the second uplink grant and does not transmit the first MAC PDU according to the first uplink grant. The processor autonomously triggers a retransmission of the first MAC PDU for the first HARQ process without receiving network signaling for the retransmission.

8 Claims, 9 Drawing Sheets

(51) Int. Cl.
*H04W 72/23* (2023.01)
*H04W 72/566* (2023.01)

(58) Field of Classification Search
CPC ....... H04L 5/0053; H04L 1/08; H04L 5/0044; H04L 5/16; H04L 1/1854; H04L 1/1819; H04L 1/189; H04L 1/1816; H04W 74/0808; H04W 72/14; H04W 16/14; H04W 72/042; H04W 4/70; H04W 72/0413; H04W 72/04; H04W 72/0446; H04W 72/56; H04W 52/281; H04W 72/115
See application file for complete search history.

(56) References Cited

U.S. PATENT DOCUMENTS

2011/0044195 A1* 2/2011 Wiemann .............. H04L 1/1874 370/252
2013/0039292 A1* 2/2013 Liu ........................ H04W 72/04 370/329
2013/0083737 A1* 4/2013 Earnshaw ............. H04L 1/1887 370/329
2014/0056278 A1* 2/2014 Marinier ............. H04W 52/367 370/330
2016/0095134 A1* 3/2016 Chen ..................... H04L 1/1822 370/336
2017/0034850 A1* 2/2017 Rico Alvarino ...... H04L 5/0064
2018/0279262 A1 9/2018 Babaei et al.
2018/0332501 A1 11/2018 Tseng et al.
2019/0053211 A1 2/2019 Ying et al.
2019/0149273 A1* 5/2019 Golitschek Edler von Elbwart ... H04W 52/48 714/748
2019/0215862 A1* 7/2019 Kim .................... H04W 74/006
2021/0136729 A1* 5/2021 Yasukawa ............. H04W 72/02

OTHER PUBLICATIONS

3GPP, "3rd Generation Partnership Project; Technical Specification Group Services and System Aspects; Study on Communication for Automation in Vertical Domains (Release 16)", 3GPP TR 22.804 V16.2.0, Dec. 2018, pp. 1-196.
CATT, "Survival time support in 5GS", 3GPP TSG-RAN WG2 Meeting #105 R2-1900159, Feb. 25-Mar. 1 Nov. 2018, pp. 1-6.
PCT/IB2020/000158, "Invitation to Pay Additional Fees and, Where Applicable, Protest Fee", PCT ISA, Aug. 3, 2020, pp. 1-14.
ZTE, Sanechips, "About Uu enhancements for advanced V2X use cases", 3GPP TSG RAN WG1 Meeting #96 R1-1902140, Feb. 25-Mar. 1, 2019, pp. 1-2.
Nokia, Nokia Shanghai Bell, "On Configured Grant enhancements for NR URLLC", 3GPP TSG RAN WG1 Ad-Hoc Meeting 1901 R1-1900932, Jan. 21-25, 2019, pp. 1-12.
CATT, "Scenarios Analysis for Intra-UE Prioritization and Multiplexing", 3GPP TSG-RAN WG2 Meeting 105 R2-1900155, Feb. 25-Mar. 1, 2019, pp. 1-7.
3GPP, "3rd Generation Partnership Project; Technical Specification Group Radio Access Network; Evolved Universal Terrestrial Radio Access (E-UTRA); Medium Access Control (MAC) protocol specification (Release 13)", 3GPP TS 36.321 V13.0.0, Dec. 2015, pp. 1-82.
ETSI, "5G; NR; Medium Access Control (MAC) protocol specification", 3GPP TS 38.321 V15.6.0 Release 15, Jul. 2019, pp. 1-80.

* cited by examiner

Mobile Core Network 140

UDM 149

PCF 147

UPF 145

SMF 143

AMF 141

Packet Data Network 150

Application Server 151

Radio Access Network 120

Base Unit 110

UL/DL 115

Remote Unit 105

App 107

High Urgency Communication 125

100 gNB 210

UE 205

Transfer interval, e.g., 1ms

Msg n
High Urgency Data

CG-1 *n*

215

Msg n is duplicated and stored without transmitting

220

NACK

UE detects implicit duplication activation trigger

225

230

CG-2 *n*

ReTx of Msg n

Duplicate of Msg n is sent on CG of LCH2

CG-1 *n+1*

235

Msg n+1
High Urgency Data

AUTONOMOUSLY TRIGGERING RETRANSMISSION OF DATA

CROSS-REFERENCE TO RELATED APPLICATIONS

This application claims priority to U.S. Provisional Patent Application No. 62/809,483 entitled "SELECTIVE DUPLICATION FOR HIGH URGENCY DATA" and filed on Feb. 22, 2019 for Joachim Loehr, Ravi Kuchibhotla, and Karthikeyan Ganesan, which application is incorporated herein by reference.

FIELD

The subject matter disclosed herein relates generally to wireless communications and more particularly relates to selective duplication of high urgency ultra-reliable data transmissions.

BACKGROUND

The following abbreviations are herewith defined, at least some of which are referred to within the following description:

Third Generation Partnership Project ("3GPP"), Fifth Generation Core Network ("5CG"), Fifth Generation System ("5GS"), Authentication, Authorization and Accounting ("AAA"), Access and Mobility Management Function ("AMF"), Positive-Acknowledgment ("ACK"), Application Programming Interface ("API"), Access Stratum ("AS"), Autonomous Uplink ("AUL"), Base Station ("BS"), Bandwidth Part ("BWP"), Control Element ("CE"), Core Network ("CN"), Control Plane ("CP"), Data Radio Bearer ("DRB"), Downlink Control Information ("DCI"), Downlink ("DL"), Discontinuous Transmission ("DTX"), Enhanced Mobile Broadband ("eMBB"), Evolved Node-B ("eNB"), Evolved Packet Core ("EPC"), Evolved Packet System ("EPS"), General Packet Radio Service ("GPRS"), Generic Public Service Identifier ("GPSI"), Global System for Mobile Communications ("GSM"), Hybrid Automatic Repeat Request ("HARQ"), Home Subscriber Server ("HSS"), Home Public Land Mobile Network ("HPLMN"), Information Element ("IE"), Internet-of-Things ("IoT"), Industrial IoT ("MoT"), Long Term Evolution ("LTE"), Medium Access Control ("MAC"), Mobility Management Entity ("MME"), Machine Type Communication ("MTC"), Negative-Acknowledgment ("NACK" or "NAK"), New Generation (i.e., 5G) Node-B ("gNB"), New Generation Radio Access Network ("NG-RAN", a RAN used for 5GS networks), New Radio ("NR", a 5G radio access technology; also referred to as "5G NR"), Non-Access Stratum ("NAS"), Network Exposure Function ("NEF"), Packet Data Convergence Protocol ("PDCP"), Packet Data Unit ("PDU", used in connection with a 'PDU Session'), Packet Switched ("PS", e.g., Packet Switched domain or Packet Switched service), Physical Downlink Control Channel ("PDCCH"), Physical Downlink Shared Channel ("PDSCH"), Physical Random Access Channel ("PRACH"), Physical Resource Block ("PRB"), Physical Uplink Control Channel ("PUCCH"), Physical Uplink Shared Channel ("PUSCH"), Public Land Mobile Network ("PLMN"), Quality of Service ("QoS"), Radio Access Network ("RAN"), Radio Access Technology ("RAT"), Radio Resource Control ("RRC"), Random-Access Channel ("RACH"), Reference Signal ("RS"), Reference Signal Received Power ("RSRP"), Receive ("RX"), Radio Link Control ("RLC"), Scheduling Request ("SR"), Secondary Cell ("SCell"), Session Management Function ("SMF"), Signal-to-Interference-Plus-Noise Ratio ("SINR"), Single Network Slice Selection Assistance Information ("S-NSSAI"), Sounding Reference Signal ("SRS"), Transport Block ("TB"), Transport Block Size ("TBS"), Transmission Time Interval ("TTI"), Transmit ("TX"), Unified Data Management ("UDM"), User Data Repository ("UDR"), Uplink Control Information ("UCI"), User Entity/Equipment (Mobile Terminal) ("UE"), Uplink ("UL"), User Plane ("UP"), Universal Mobile Telecommunications System ("UMTS"), Ultra-reliability and Low-latency Communications ("URLLC"), Visited Public Land Mobile Network ("VPLMN"), and Worldwide Interoperability for Microwave Access ("WiMAX"). As used herein, "HARQ-ACK" may represent collectively the Positive Acknowledge ("ACK") and the Negative Acknowledge ("NACK") and Discontinuous Transmission ("DTX"). ACK means that a TB is correctly received while NACK (also written as "NAK") means a TB is erroneously received. DTX means that no TB was detected.

In certain wireless communication systems, packet duplication is used to increase transmission reliability. In packet duplication, multiple copies of the data packet are sent to the receiver, for example over multiple logical channels. However, in current wireless communication systems the activation/deactivation of PDCP duplication must be triggered by the base station, e.g., by MAC CE signaling from a gNB. For high urgency data transmissions requiring ultra-reliability, waiting for the network to react not be fast enough to meet QoS targets.

BRIEF SUMMARY

Disclosed are procedures for selective duplication of high urgency ultra-reliable data transmissions. One method of a UE, e.g., for managing UL preemption, includes generating—at the UE—a first MAC PDU for a first uplink grant associated with a first HARQ process and generating at the UE—a second MAC PDU for a second uplink grant associated with a second HARQ process Here, the first uplink grant is a configured grant and the second uplink grant has overlapping PUSCH resources with the first uplink grant. Moreover, the second uplink grant has a higher priority than the first uplink grant. The first method also includes transmitting the second MAC PDU according to the second uplink grant and not transmitting the first MAC PDU according to the first uplink grant. The first method further includes autonomously triggering a retransmission of the first MAC PDU for the first HARQ process. Here, autonomously triggering the retransmission comprises triggering the retransmission without receiving network signaling for the retransmission.

Another method of a UE, e.g., for managing packet duplication, includes duplicating—at the UE—an initial PDCP PDU prior to detecting a trigger for activating PDCP duplication and storing—at the UE—the duplicated PDCP PDU in a buffer without transmitting. The second method includes transmitting the initial PDCP PDU to a recipient. The second method includes discarding the duplicated PDCP PDU without transmitting in response to receiving a positive acknowledgement corresponding to the initial PDCP PDU and transmitting the duplicated PDCP PDU in response to detecting the trigger for activating PDCP duplication.

BRIEF DESCRIPTION OF THE DRAWINGS

A more particular description of the embodiments briefly described above will be rendered by reference to specific embodiments that are illustrated in the appended drawings. Understanding that these drawings depict only some embodiments and are not therefore to be considered to be limiting of scope, the embodiments will be described and explained with additional specificity and detail through the use of the accompanying drawings, in which.

DETAILED DESCRIPTION

Figure 1:
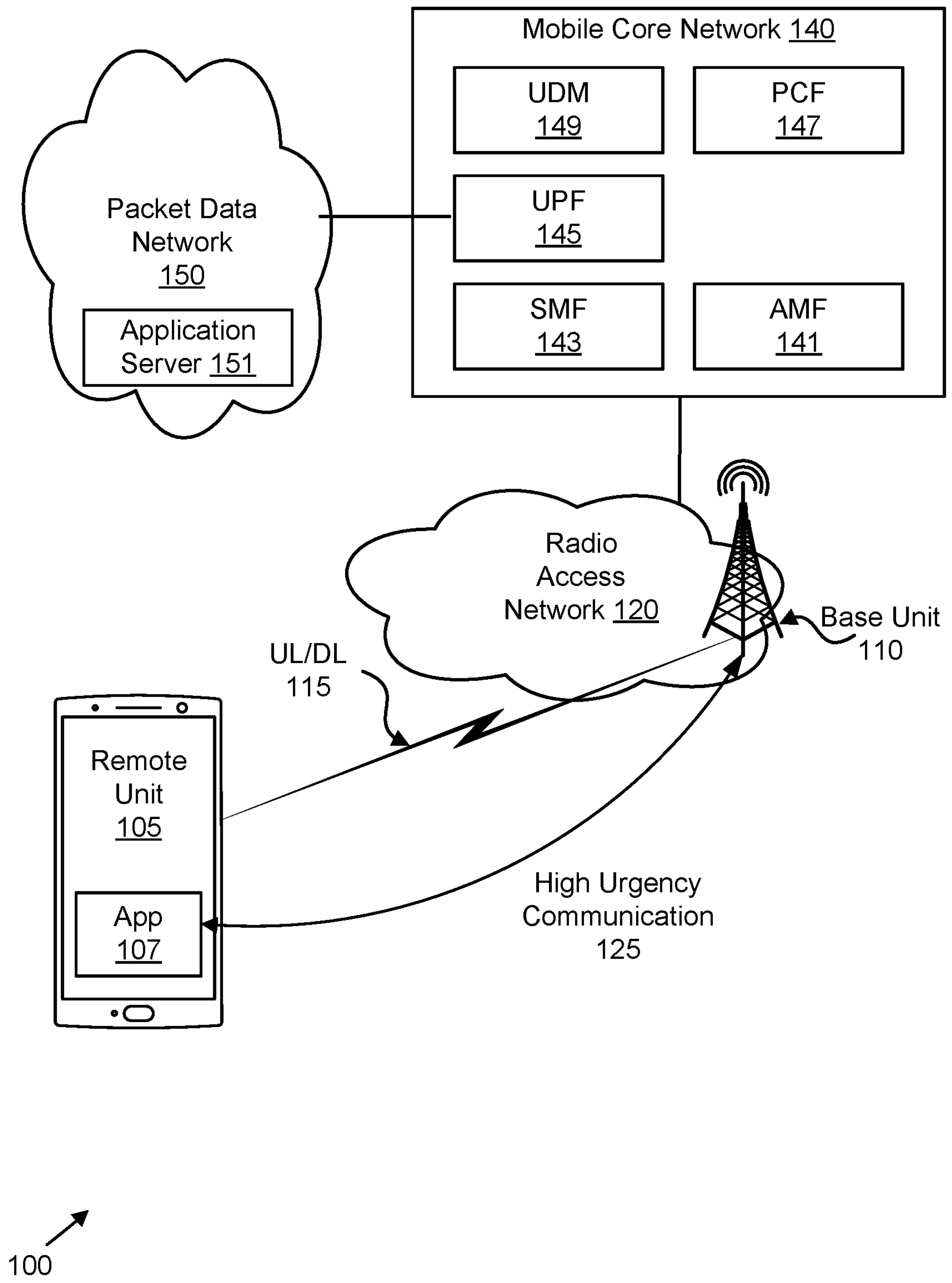
FIG. 1 is a schematic block diagram illustrating one embodiment of a wireless communication system for selective packet duplication.

As will be appreciated by one skilled in the art, aspects of the embodiments may be embodied as a system, apparatus, method, or program product. Accordingly, embodiments may take the form of an entirely hardware embodiment, an entirely software embodiment (including firmware, resident software, micro-code, etc.) or an embodiment combining software and hardware aspects.

For example, the disclosed embodiments may be implemented as a hardware circuit comprising custom very-large-scale integration ("VLSI") circuits or gate arrays, off-the-shelf semiconductors such as logic chips, transistors, or other discrete components. The disclosed embodiments may also be implemented in programmable hardware devices such as field programmable gate arrays, programmable array logic, programmable logic devices, or the like. As another example, the disclosed embodiments may include one or more physical or logical blocks of executable code which may, for instance, be organized as an object, procedure, or function.

Furthermore, embodiments may take the form of a program product embodied in one or more computer readable storage devices storing machine readable code, computer readable code, and/or program code, referred hereafter as code. The storage devices may be tangible, non-transitory, and/or non-transmission. The storage devices may not embody signals. In a certain embodiment, the storage devices only employ signals for accessing code.

Any combination of one or more computer readable medium may be utilized. The computer readable medium may be a computer readable storage medium. The computer readable storage medium may be a storage device storing the code. The storage device may be, for example, but not limited to, an electronic, magnetic, optical, electromagnetic, infrared, holographic, micromechanical, or semiconductor system, apparatus, or device, or any suitable combination of the foregoing.

More specific examples (a non-exhaustive list) of the storage device would include the following: an electrical connection having one or more wires, a portable computer diskette, a hard disk, a random-access memory ("RAM"), a read-only memory ("ROM"), an erasable programmable read-only memory ("EPROM" or Flash memory), a portable compact disc read-only memory ("CD-ROM"), an optical storage device, a magnetic storage device, or any suitable combination of the foregoing. In the context of this document, a computer readable storage medium may be any tangible medium that can contain or store a program for use by or in connection with an instruction execution system, apparatus, or device.

Code for carrying out operations for embodiments may be any number of lines and may be written in any combination of one or more programming languages including an object-oriented programming language such as Python, Ruby, Java, Smalltalk, C++, or the like, and conventional procedural programming languages, such as the "C" programming language, or the like, and/or machine languages such as assembly languages. The code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network ("LAN") or a wide area network ("WAN"), or the connection may be made to an external computer (for example, through the Internet using an Internet Service Provider).

Reference throughout this specification to "one embodiment," "an embodiment," or similar language means that a particular feature, structure, or characteristic described in connection with the embodiment is included in at least one embodiment. Thus, appearances of the phrases "in one embodiment," "in an embodiment," and similar language throughout this specification may, but do not necessarily, all refer to the same embodiment, but mean "one or more but not all embodiments" unless expressly specified otherwise. The terms "including," "comprising," "having," and variations thereof mean "including but not limited to," unless expressly specified otherwise. An enumerated listing of items does not imply that any or all of the items are mutually exclusive, unless expressly specified otherwise. The terms "a," "an," and "the" also refer to "one or more" unless expressly specified otherwise.

As used herein, a list with a conjunction of "and/or" includes any single item in the list or a combination of items in the list. For example, a list of A, B and/or C includes only A, only B, only C, a combination of A and B, a combination of B and C, a combination of A and C or a combination of A, B and C. As used herein, a list using the terminology "one or more of" includes any single item in the list or a combination of items in the list. For example, one or more of A, B and C includes only A, only B, only C, a combination of A and B, a combination of B and C, a combination of A and C or a combination of A, B and C. As used herein, a list using the terminology "one of" includes one and only one of any single item in the list. For example, "one of A, B and C" includes only A, only B or only C and excludes combinations of A, B and C. As used herein, "a member selected from the group consisting of A, B, and C," includes one and only one of A, B, or C, and excludes combinations of A, B, and C." As used herein, "a member selected from the group consisting of A, B, and C and combinations thereof" includes only A, only B, only C, a combination of A and B, a combination of B and C, a combination of A and C or a combination of A, B and C.

Furthermore, the described features, structures, or characteristics of the embodiments may be combined in any suitable manner. In the following description, numerous specific details are provided, such as examples of programming, software modules, user selections, network transactions, database queries, database structures, hardware modules, hardware circuits, hardware chips, etc., to provide a thorough understanding of embodiments. One skilled in the relevant art will recognize, however, that embodiments may be practiced without one or more of the specific details, or with other methods, components, materials, and so forth. In other instances, well-known structures, materials, or operations are not shown or described in detail to avoid obscuring aspects of an embodiment.

Aspects of the embodiments are described below with reference to schematic flowchart diagrams and/or schematic block diagrams of methods, apparatuses, systems, and program products according to embodiments. It will be understood that each block of the schematic flowchart diagrams and/or schematic block diagrams, and combinations of blocks in the schematic flowchart diagrams and/or schematic block diagrams, can be implemented by code. This code may be provided to a processor of a general-purpose computer, special purpose computer, or other programmable data processing apparatus to produce a machine, such that the instructions, which execute via the processor of the computer or other programmable data processing apparatus, create means for implementing the functions/acts specified in the flowchart diagrams and/or block diagrams.

The code may also be stored in a storage device that can direct a computer, other programmable data processing apparatus, or other devices to function in a particular manner, such that the instructions stored in the storage device produce an article of manufacture including instructions which implement the function/act specified in the flowchart diagrams and/or block diagrams.

The code may also be loaded onto a computer, other programmable data processing apparatus, or other devices to cause a series of operational steps to be performed on the computer, other programmable apparatus or other devices to produce a computer implemented process such that the code which execute on the computer or other programmable apparatus provide processes for implementing the functions/acts specified in the flowchart diagrams and/or block diagrams.

The flowchart diagrams and/or block diagrams in the Figures illustrate the architecture, functionality, and operation of possible implementations of apparatuses, systems, methods, and program products according to various embodiments. In this regard, each block in the flowchart diagrams and/or block diagrams may represent a module, segment, or portion of code, which includes one or more executable instructions of the code for implementing the specified logical function(s).

It should also be noted that, in some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. Other steps and methods may be conceived that are equivalent in function, logic, or effect to one or more blocks, or portions thereof, of the illustrated Figures.

Although various arrow types and line types may be employed in the flowchart and/or block diagrams, they are understood not to limit the scope of the corresponding embodiments. Indeed, some arrows or other connectors may be used to indicate only the logical flow of the depicted embodiment. For instance, an arrow may indicate a waiting or monitoring period of unspecified duration between enumerated steps of the depicted embodiment. It will also be noted that each block of the block diagrams and/or flowchart diagrams, and combinations of blocks in the block diagrams and/or flowchart diagrams, can be implemented by special purpose hardware-based systems that perform the specified functions or acts, or combinations of special purpose hardware and code.

The description of elements in each figure may refer to elements of proceeding figures. Like numbers refer to like elements in all figures, including alternate embodiments of like elements.

Described herein are systems, methods, and apparatus for selective duplication of data, e.g., for the UEs engaged on high urgency ultra-reliable data transmissions. As noted above, the activation/deactivation of PDCP duplication by MAC CE signaling from network might not be fast enough for NR Industrial IoT ("I-IoT") applications targeted. Additionally, conventional PDCP duplication applies only to new packets (e.g., the next PDCP PDU generated after activation of PDCP duplication). Accordingly, conventional PDCP duplication does not increase the reliability for a packet for which a HARQ retransmission is required.

Therefore, to meet service requirements for high urgency ultra-reliable data transmissions (e.g., URLLC), the UE is able to autonomously enable PDCP duplication for selected packets. In certain embodiments, the UE may activate duplication upon receiving a non-toggled NDI for an UL HARQ process carrying a DRB requiring the support of a survival time.

To support high urgency, ultra-reliable data transmissions the following may be implemented:

For the UE-controlled (i.e., autonomous) activation/deactivation of PDCP duplication, in certain embodiments the UE always duplicates PDCP service data units ("SDUs")/Protocol Data Units ("PDUs") at the PDCP layer and submits the PDCP PDUs to lower layers. As used herein, service data unit ("SDU") refers to a unit of data that has been passed down from a higher layer (or sublayer) to a lower layer. The lower layer encapsulates the unit of data (i.e., SDU) to form a protocol data unit ("PDU"). Note that the PDU of the higher layer becomes the SDU for the lower layer.

In one embodiment, the duplicate PDCP PDU is submitted to MAC layer, i.e., into a HARQ buffer (e.g., associated with a predefined and/or reserved HARQ process). Note that submitting the PDCP PDU to the MAC layer may require a predefined grant. Here, the UE may submit the PDCP PDU assuming a predefined grant. In another embodiment, the duplicate PDCP PDU is submitted to the RLC layer, for example, as a form of pre-processing.

In some embodiments of the UE-controlled activation/deactivation of PDCP duplication, one copy of the PDCP PDU goes to a primary RLC entity, while the duplicate(s) of the PDCP PDU goes to secondary RLC entity/entities. Note that each RLC entity is associated with a logical channel ("LCH"). However, until activation of packet duplication is triggered at the UE, only the primary RLC entity/LCH transmits the PDCP PDU(s). As such, the secondary RLC entities/LCH(s) receive the duplicated PDCP PDUs, but do not transmit until it is determined to "activate" the PDCP duplication. In such embodiments, the secondary RLC entities queue up duplicated PDCP PDUs while PDCP duplication is deactivated and only transmit the duplicated PDCP PDUs upon activation of PDCP duplication.

Moreover, in the UE-controlled activation/deactivation of PDCP duplication, for the case of receiving a HARK ACK (i.e., indicating successful receipt of a PDCP PDU, e.g., original PDCP PDU carried via the primary LCH), the UE discards the duplicated PDCP PDU(s) stored at the MAC layer, e.g., MAC PDU containing the duplicate PDCP PDU stored in a HARQ buffer of a secondary LCH. Alternatively, the UE may discard an RLC SDU/PDU (e.g., part of pre-processing) carrying a duplicate PDCP PDU corresponding to the successfully received original PDCP PDU.

Further, regarding RLC sequence number ("SN") handling for secondary LCH, the secondary RLC entity may reassign the RLC sequence numbers of stored (pre-generated) RLC PDU(s) when the HARQ ACK is received in order to avoid gaps in the sequence numbering.

However, in the case of receiving a HARQ NACK (i.e., indicating unsuccessful receipt of a PDCP PDU), the UE may enable duplication for the retransmission and, optionally, for subsequent PDCP PDUs. Moreover, if a duplicate of the unsuccessfully received PDCP PDU is in the HARQ buffer of a secondary LCH, the UE may transmit the duplicate PDCP PDU. In one embodiment, the UE performs an initial transmission (e.g., with RV 0) of the PDCP PDU on the secondary LCH/RLC entity. In various embodiments, LCH restriction is dynamically and/or autonomously adapted in order to make sure that the duplicate PDCP PDUs are not transmitted on the same carrier by the UE, thereby achieving spatial diversity for the case where the secondary RLC/LCH transmits a duplicate PDCP PDU. Alternatively, the UE may already use the LCH restriction for the primary LCH even while PDCP PDU duplication is not active (i.e., when duplicated PDCP PDUs are generated, but not transmitted).

For network-controlled duplication activation/deactivation, the DCI scheduling retransmission may indicate to the UE whether to enable duplication. In certain embodiments, the DCI includes a flag signaling whether to activate (alternatively, deactivate) duplication. Here, it is assumed that a configured grant ("CG") was used for the initial transmission, rather than a dynamic grant.

Regarding power control behavior, in case the initial transmission fails, the target received power level $P_0$ for PUSCH may be increased or the alpha value in order to increase the reliability, e.g., power ramping for PUSCH. In certain embodiments, the gNB may configure a set of $P_0$ values for URLLC (e.g., high urgency LCHs).

In various embodiments, the network status indicates an "up state" or a "down state," defined using a survival timer. When the network is up and running, the network status indicates "up state." A source device (e.g., UE) starts sending messages to a target device, on which an automation function (e.g., target application) is running. The communication service is, from the point of view of the target application, in an up state or in a down state based on correctly received messages. Note that up state and down state time intervals of the target device (e.g., application) are offset from the up state and down state time intervals of the network.

The network transitions into the down state if it no longer can support end-to-end transmission of the source device's messages to the target device according to the negotiated communication QoS. Once the application on the target device senses the absence of expected messages (i.e., reaches the deadline for an expected message), it will wait a pre-set period before it considers the communication service to be unavailable, said period referred to as the "survival time." The survival time can be expressed as a period of time or, especially with cyclic traffic, as maximum number of consecutive incorrectly received or lost messages.

Once the survival time has been exceeded, the target application transitions the status of the communication service into a down state (status of application changes to down). The application will usually take corresponding actions for handling such situations of unavailable communication services. For instance, it may commence an emergency shutdown. This does not imply that the target application is shut off; rather it transitions into a pre-defined state, e.g., a safe state. As a general rule, the target application still "listens" to incoming packets or may try to send messages to the source application.

Once the network/communication service is in the up state again (i.e., network status changes to the up state), the communication service state as perceived by the target application will change to the up state after the offset time. The communication service is thus again perceived as available as soon as a message is correctly received by the application at the target device. The state of the application, however, may depend on the counter measures taken by the application. The application may remain in the down state if it is in a safe state due to an emergency shutdown. Alternatively, the application may do a recovery and change to the up state again.

Because exceeding the survival time has quite severe consequences, i.e., status of the communication service transitions to a "down state," it should be the goal to ensure that transmissions of delay sensitive applications, e.g., TSN traffic flows, are correctly received within the end-to-end latency budget in order to avoid the unavailable time, i.e., down state. Therefore, the Radio Access network (RAN) needs to quickly react by increasing the reliability of the wireless link for the concerned traffic flow(s). Disclosed herein are several embodiments which allow a fast reaction to transmission errors over the wireless channel by dynamically and selectively enabling PDCP duplication.

When the application is in "down state," i.e., survival timer expired, the UE may proactively transmit with increased reliability in order to make sure that the application gets as soon as possible back to "up/running" state. Additionally, the UE may also do one or more of: autonomously activate PDCP duplication, turn on power ramping, and/or turn on spatial diversity.

In various embodiments, the UE may preempt a lower priority MAC PDU in favor of a higher priority MAC PDU. Upon preempting the lower priority data, the UE triggers (internally) a HARQ retransmission for the pre-empted PDU. In certain embodiments, the PHY layer at the UE may indicate NACK to the MAC layer, e.g., assuming that pre-emption is done in PHY without the knowledge of MAC.

FIG. 1 depicts a wireless communication system 100 for selective duplication of high urgency ultra-reliable data transmissions, according to embodiments of the disclosure. In one embodiment, the wireless communication system 100 includes at least one remote unit 105, a radio access network ("RAN") 120, and a mobile core network 140. The RAN 120 and the mobile core network 140 form a mobile communication network. The RAN 120 may be composed of a base unit 110 with which the remote unit 105 communicates using wireless communication links 115. Even though a specific number of remote units 105, base units 110, wireless communication links 115, RANs 120, and mobile core networks 140 are depicted in FIG. 1, one of skill in the art will recognize that any number of remote units 105, base units 110, wireless communication links 115, RANs 120, and mobile core networks 140 may be included in the wireless communication system 100.

In one implementation, the wireless communication system 100 is compliant with the 5G system specified in the 3GPP specifications. More generally, however, the wireless communication system 100 may implement some other open or proprietary communication network, for example, LTE or WiMAX, among other networks. The present disclosure is not intended to be limited to the implementation of any particular wireless communication system architecture or protocol.

In one embodiment, the remote units 105 may include computing devices, such as desktop computers, laptop computers, personal digital assistants ("PDAs"), tablet computers, smart phones, smart televisions (e.g., televisions connected to the Internet), smart appliances (e.g., appliances connected to the Internet), set-top boxes, game consoles, security systems (including security cameras), vehicle on-board computers, network devices (e.g., routers, switches, modems), or the like. In some embodiments, the remote units 105 include wearable devices, such as smart watches, fitness bands, optical head-mounted displays, or the like. Moreover, the remote units 105 may be referred to as the UEs, subscriber units, mobiles, mobile stations, users, terminals, mobile terminals, fixed terminals, subscriber stations, user terminals, wireless transmit/receive unit ("WTRU"), a device, or by other terminology used in the art.

The remote units 105 may communicate directly with one or more of the base units 110 in the RAN 120 via uplink ("UL") and downlink ("DL") communication signals. Furthermore, the UL and DL communication signals may be carried over the wireless communication links 115. Here, the RAN 120 is an intermediate network that provides the remote units 105 with access to the mobile core network 140.

In some embodiments, the remote units 105 communicate with an application server 151 via a network connection with the mobile core network 140. For example, an application 107 (e.g., I-IoT application) in a remote unit 105 may trigger the remote unit 105 to establish a PDU session (or other data connection) with the mobile core network 140 via the RAN 120. The mobile core network 140 then relays traffic (e.g., high urgency communications 125) between the remote unit 105 and the application server 151 in the packet data network 150 using the PDU session. Note that the remote unit 105 may establish one or more PDU sessions (or other data connections) with the mobile core network 140. As such, the remote unit 105 may concurrently have at least one PDU session for communicating with the packet data network 150 and at least one PDU session for communicating with another data network (not shown).

The base units 110 may be distributed over a geographic region. In certain embodiments, a base unit 110 may also be referred to as an access terminal, an access point, a base, a base station, a Node-B, an eNB, a gNB, a Home Node-B, a relay node, or by any other terminology used in the art. The base units 110 are generally part of a radio access network ("RAN"), such as the RAN 120, that may include one or more controllers communicably coupled to one or more corresponding base units 110. These and other elements of radio access network are not illustrated but are well known generally by those having ordinary skill in the art. The base units 110 connect to the mobile core network 140 via the RAN 120.

The base units 110 may serve a number of remote units 105 within a serving area, for example, a cell or a cell sector, via a wireless communication link 115. The base units 110 may communicate directly with one or more of the remote units 105 via communication signals. Generally, the base units 110 transmit DL communication signals to serve the remote units 105 in the time, frequency, and/or spatial domain. Furthermore, the DL communication signals may be carried over the wireless communication links 115. The wireless communication links 115 may be any suitable carrier in licensed or unlicensed radio spectrum. The wireless communication links 115 facilitate communication between one or more of the remote units 105 and/or one or more of the base units 110.

In one embodiment, the mobile core network 140 is a 5G core ("5GC") or the evolved packet core ("EPC"), which may be coupled to a packet data network 150, like the Internet and private data networks, among other data networks. A remote unit 105 may have a subscription or other account with the mobile core network 140. Each mobile core network 140 belongs to a single public land mobile network ("PLMN"). The present disclosure is not intended to be limited to the implementation of any particular wireless communication system architecture or protocol.

The mobile core network 140 includes several network functions ("NFs"). As depicted, the mobile core network 140 includes multiple user plane functions ("UPFs") 145. The mobile core network 140 also includes multiple control plane functions including, but not limited to, an Access and Mobility Management Function ("AMF") 141 that serves the RAN 120, a Session Management Function ("SMF") 143, and a Policy Control Function ("PCF") 147. In certain embodiments, the mobile core network 140 may also include an Authentication Server Function ("AUSF"), a Unified Data Management function ("UDM") 149, a Network Repository Function ("NRF") (used by the various NFs to discover and communicate with each other over APIs), or other NFs defined for the 5GC.

In various embodiments, the mobile core network 140 supports different types of mobile data connections and different types of network slices, wherein each mobile data connection utilizes a specific network slice. Here, a "network slice" refers to a portion of the mobile core network 140 optimized for a certain traffic type or communication service. Each slice may be identified using a S-NSSAI. In certain embodiments, the various network slices may include separate instances of network functions, such as the SMF 143 and UPF 145. In some embodiments, the different network slices may share some common network functions, such as the AMF 141. The different network slices are not shown in FIG. 1 for ease of illustration, but their support is assumed.

Although specific numbers and types of network functions are depicted in FIG. 1, one of skill in the art will recognize that any number and type of network functions may be included in the mobile core network 140. Moreover, where the mobile core network 140 is an EPC, the depicted network functions may be replaced with appropriate EPC entities, such as an MME, S-GW, P-GW, HSS, and the like. In certain embodiments, the mobile core network 140 may include a AAA server.

While FIG. 1 depicts components of a 5G RAN and a 5G core network, the described embodiments for selective duplication of high urgency ultra-reliable data transmissions apply to other types of communication networks, including IEEE 802.11 variants, GSM, GPRS, UMTS, LTE variants, CDMA 2000, Bluetooth, ZigBee, Sigfoxx, and the like. For example, in an LTE variant involving an EPC, the AMF 135 may be mapped to an MME, the SMF mapped to a control plane portion of a PGW and/or to an MME, the UPF map to an SGW and a user plane portion of the PGW, the UDM/UDR maps to an HSS, etc.

As discussed above, the remote unit 105 may autonomously generate duplicate PDCP PDUs and only transmit the duplicates when an activation trigger for PDCP duplication is detected. This activation trigger may be an implicit indication (e.g., receipt of a predetermined number of HARQ NACK messages) or may be signaling from the base unit 110 (e.g., the RAN node sending DCI for a retransmission of a PDCP PDU).

Moreover, the remote unit 105 may preempt (i.e., not transmit) a lower priority PDU in order to transmit a higher priority PDU if the associated uplink grants have overlapping PUSCH resources. In such embodiments, the remote unit 105 may autonomously trigger retransmission of the lower priority PDU.

Figure 2:
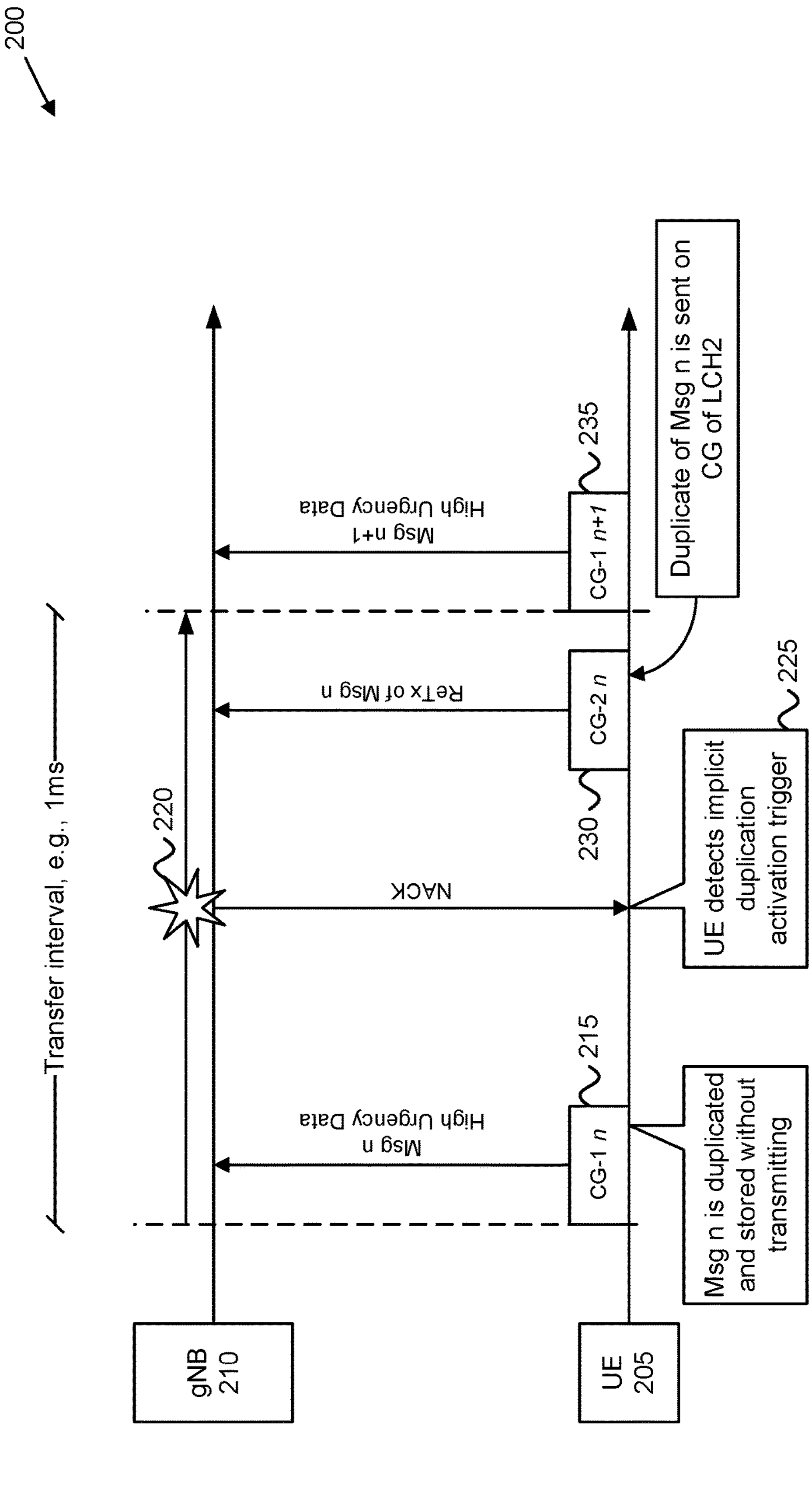
FIG. 2 is a diagram illustrating one embodiment of autonomous PDCP duplication.

FIG. 2 depicts a diagram 200 for autonomous (i.e., UE-controlled) activation of PDCP PDU duplication involving a UE 205 and a gNB 210. The UE 205 is an implementation of the remote unit 105 and the gNB 210 is an implementation of the base unit 110. In order to improve reliability both for initial transmissions of data and retransmissions, the UE 205 may proactively duplicate PDCP PDUs without transmission (of the duplicates) until detecting an activation trigger for PDCP duplication.

According to a first solution, the UE 205 selectively enables duplication for the transmission (including, retransmission) of a MAC PDU containing a PDCP PDU according to certain predefined criteria. In order to be able to transmit duplicate(s) of a PDCP PDU for which the original PDCP PDU is under HARQ retransmission, i.e., HARQ NACK has been received for the MAC PDU containing the original PDCP PDU, the duplicates of the original PDCP PDU must be already available for transmission.

As such, the UE 205 has a first uplink grant corresponding to a first transmission opportunity 215 for a first configured grant ("CG-1"). Here, the UE 205 generates a data packet (e.g., PDCP PDU) for transmission on the first uplink grant. The data packet is referred to as "Msg n" and may include high priority data. Moreover, the UE 205 proactively duplicates the "Msg n" and stores the duplicate PDCP PDU without transmitting.

In the depicted embodiment, the gNB 210 experiences unsuccessful reception 220 of the Msg n, and so sends a NACK to the UE 205. Here, the UE 205 interprets the NACK as a duplication activation trigger 225.

Figure 3:
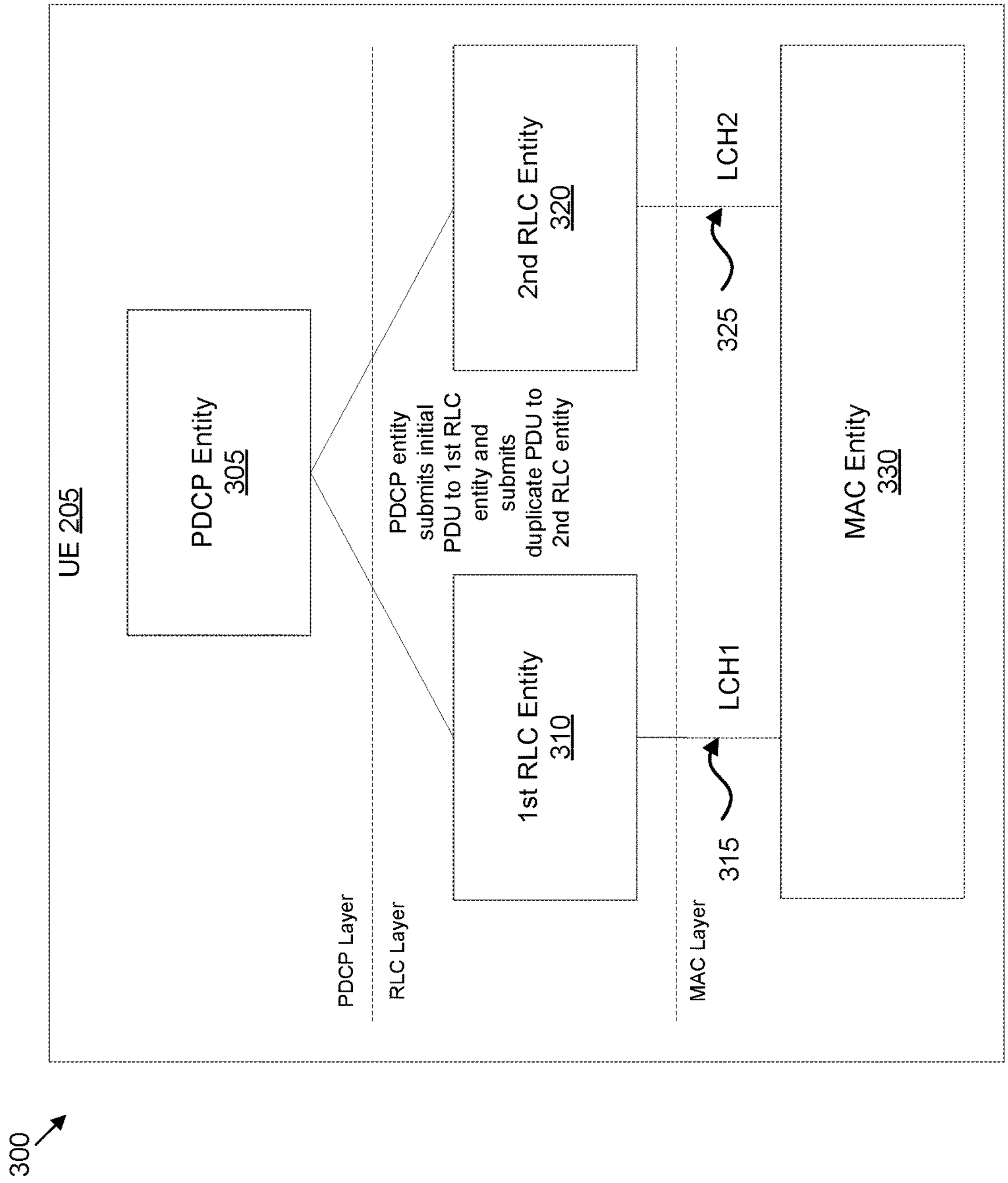
FIG. 3 is a block diagram illustrating one embodiment of a UE protocol stack.

FIG. 3 depicts a protocol stack 300 for PDCP data PDU duplication, according to embodiments of the disclosure. The protocol stack 300 may be implemented within a UE 205, such as the UE 205. The protocol stack 300 includes a PDCP entity 305 located at the PDCP layer. The PDCP entity 305 is mapped to multiple RLC entities, here the first RLC entity 310 (associated with a first Logical Channel 315) and a second RLC entity 320 (associated with a second Logical Channel 325). Here, the original PDCP data PDU (e.g., initial PDCP PDU) is submitted to the first RLC entity 310, while the duplicate PDCP data PDU is submitted to the second RLC entity 320. In the depicted embodiment, each RLC entity 310, 320 is mapped to the same MAC entity 330. However, if the UE 205 is configured with multiple carriers belonging to different cell groups, then the first RLC entity 310 and second RLC entities may be mapped to different MAC entities.

Therefore, according to one implementation of the first solution the UE 205 duplicates each PDCP SDU/PDU of a DRB configured for duplication at the PDCP transmitting entity 305 and submits the duplicate(s) proactively to the at least one second RLC entity 320 which is configured for PDCP duplication, also referred to as "secondary" LCHs 325. Note that the duplication at the PDCP layer is done even though duplicate transmissions are currently deactivated, i.e., PDCP PDUs are only transmitted via a single (primary) logical channel on PUSCH.

Essentially the UE 205 pre-generates the duplicates of the PDCP PDUs (i.e., prior to actual activation of PDCP duplication) in order to quickly enable duplicate transmissions, e.g., for cases when the MAC PDU containing an original PDCP PDU needs to be retransmitted. In one implementation of the first solution the UE 205 pre-generates RLC PDU(s) upon receiving the duplicated PDCP PDUs from the PDCP transmitting entity 305 at the corresponding RLC entity(s) 310, 320 and subsequently delivers the RLC PDUs to the MAC layer (i.e., MAC entity 330) where MAC PDUs are pre-generated. Note that in order to generate a MAC PDU, the UE 205 needs to have some valid UL grant, i.e., TB size needs to be known by the UE 205 in order to able to generate a MAC PDU/TB.

Referring again to FIG. 2, according to one implementation of the first solution, the UE 205 generates the MAC PDU according to a predefined UL grant which could be, for example, a configured grant ("CG") allocated—but not activated—by the gNB 210 for the transmission of the duplicate PDCP PDUs via the additional LCHs. As mentioned above it is expected that semi-persistent scheduling ("SPS") and Configured Grants ("CGs") will play a key role in serving the various co-existing traffic types expected in TSN networks. As a result, it is assumed that TSN streams carrying delay-sensitive data, e.g., URLLC traffic, requiring the support of a survival time is to be mapped onto an UL DRB which is configured with duplication across two or more legs, where the duplication is inactive by default. The secondary LCHs are, e.g., mapped onto configured grants (e.g., via LCP restriction parameter) dimensioned such that the resources are well aligned with the data arrival time and also well dimensioned to carry a complete TSN message/PDCP SDU, so that RLC does not need to segment it.

According to one implementation of the first solution, the UE 205 discards the pre-generated duplicate PDU(s) which are stored at the MAC layer (i.e., MAC entity 330) upon receiving an HARQ ACK for the transmission of a MAC PDU containing the original PDCP PDU carried on the (primary) LCH 315. By discarding the duplicate PDUs stored at the MAC layer (i.e., MAC entity 330) for the one or more LCHs, e.g., secondary LCH(s) 325 configured for duplication, it is ensured that a duplicate transmission is not performed for cases when the original PDCP PDU was already successfully transmitted, e.g., via the primary LCH 315. By discarding the pre-generated duplicate MAC PDUs and respectively the corresponding pre-generated RLC PDU/SDU(s) of the secondary LCH(s) 325 a wastage of radio resources is hence avoided. Further, when discarding the pre-generated RLC PDU(s), the UE 205 may reassign the RLC sequence numbers of the subsequent RLC PDUs in order to avoid a RLC SN gap.

Upon reception of a NACK for the transmission of a MAC PDU containing a PDCP/RLC PDU of the primary LCH 315, the UE 205 performs a HARQ retransmission of this MAC PDU and also transmits the pre-generated MAC PDU(s) containing the duplicate PDCP PDU(s) for the secondary LCH(s) 325 which are available for transmission at the MAC entity 330, e.g., HARQ transmission buffer, and pending for initial transmission. Those pre-generated MAC PDU(s) containing the duplicated PDCP PDU are, for example, transmitted with redundancy version (RV) zero or any other RV which ensures that the transmissions are self-decodable. As depicted in FIG. 2, a second configured grant ("CG-2") is associated with the LCH2 325 and the pre-generated duplicate PDCP PDU for Msg n is sent using PUSCH resources 230 for the CG-2. In certain embodiments, the HARQ retransmission for Msg n is sent in the next transmission opportunity for CG-1 (e.g., PUSCH resources 235).

According to an alternative implementation of the first solution, the UE 205 duplicates each PDCP SDU/PDU of a (UL) DRB configured for duplication at the PDCP transmitting entity 305 and submits the duplicate(s) to the at least one additional RLC entity/logical channel, i.e., also referred to as secondary LCHs 325, which is considered/configured for PDCP duplication. It should be emphasized on that the duplication of the PDCP PDUs is done even though duplicate transmissions are currently not activated, i.e., PDCP PDUs are only transmitted via a single (primary) logical channel 315 on PUSCH.

According to this alternative implementation the UE 205 pre-generates RLC PDU(s) upon receiving the duplicate PDCP PDUs from the PDCP transmitting entity at the RLC entity(s) 320 associated with the one or more secondary LCHs 325 and stores the pre-generated RLC PDUs at the RLC transmitting entity 320, i.e., RLC PDUs are pending for initial transmission. Generating an RLC PDU implies that an RLC SN is associated with the RLC SDU received from PDCP layer and an RLC header is generated, e.g., as further specified in 3GPP TS 38.322. When pre-generating the RLC PDUs, the UE 205 assumes that no segmentation is needed, i.e., a complete PDCP PDU is contained in one RLC PDU. In contrast to the above described implementations, in this alternative implementation the UE 205 does not submit the pre-generated RLC PDUs to the MAC layer 330 for further processing.

According to this alternative implementation of the first solution, the UE 205 discards the pre-generated RLC PDUs of the secondary LCHs 325 upon receiving an HARQ ACK for the transmission of a MAC PDU containing the original PDCP PDU carried on the (primary) LCH 315. By discarding the duplicate PDUs stored at the RLC layer for the secondary LCH(s) 325, it is ensured that a duplication transmission is not performed for cases that the transmission of a PDCP PDU was already successful on the primary LCH 315. Hence a wastage of radio resources is avoided by discarding duplicate RLC PDUs based on HARQ feedback. Further, when discarding the pre-generated duplicate RLC PDU(s), the UE 205 may reassign the RLC SN of the subsequent RLC PDUs in order to avoid a SN gap, i.e., this is important for the RLC receiving window operation.

Upon receiving a HARQ NACK for the transmission of a MAC PDU carrying a PDCP PDU of the primary LCH 315, the UE 205 may autonomously enable transmission of the pre-generated duplicate PDCP/RLC PDU(s) and optionally for further subsequent PDCP PDU transmissions according to one implementation of the first solution. To be more specific, when the UE 205 receives a HARQ NACK for the (initial) transmission of a MAC PDU containing an original PDCP/RLC PDU of the primary LCH 315, the UE 205 may perform a retransmission of this MAC PDU (carrying the data of the primary LCH 315) and, in addition, may transmit the pre-generated RLC PDU(s) containing the duplicate PDCP PDU(s) for the secondary LCH(s) 325 which are pending in the RLC layer for initial transmission.

The UE 205 submits the pre-generated RLC PDUs to the MAC layer 330 where corresponding MAC PDUs are generated and ultimately transmitted on the PUSCH(s), e.g., duplicates may be transmitted on other configured grants being scheduled/assigned for duplicate transmissions. The MAC PDU(s) containing the duplicated PDCP PDU(s) are for example transmitted with redundancy version (RV) zero or any other RV which ensures that the transmissions are self-decodable. When the duplication functionality is enabled (alternatively, "activated") the UE 205 performs the PDCP duplication operation as e.g., specified for NR Rel-15, i.e., no discarding of RLC PDUs based on the reception of a HARQ ACK.

According to one further implementation of the first solution, the UE 205 selectively enables PDCP Duplication according to some predefined criteria, i.e., upon reception of an HARQ NACK for a MAC PDU carrying an original PDCP SDU/PDU, and continues PDCP duplication for some predefined time period. In one option, the UE 205 enables PDCP duplication on a per-packet basis, i.e., duplicate transmission is only affective for the transmission of one PDCP PDU, e.g., if HARQ NACK is received for a MAC PDU containing an original PDCP PDU. Alternatively, the UE 205 when having enabled duplication—upon reception of a HARQ NACK—may perform duplicate transmissions not only for the PDCP PDU which is being retransmitted, but also for the transmission(s) of subsequent PDCP PDUs according to some predefined condition.

In one option, the UE 205 continues to perform duplication for the next N packets/PDCP PDUs—N being a predefined or network configured value. After having transmitted the N PDCP PDUs in a duplication mode, the UE 205 disables duplication and transmits each PDCP PDU/packet only via one LCH (e.g., the primary LCH 315). Alternatively, the UE 205 continues to perform duplication, i.e., transmitting PDCP PDUs over multiple LCHs, —once enabled e.g., upon reception of a NACK, until the channel condition exceeds a certain predefined/preconfigured threshold. The channel condition may be a RSRP measurement.

In yet another option the UE 205 is configured with a timer which is started when PDCP duplication is enabled, e.g., upon reception of a HARQ NACK. The UE 205 continues to do duplicates transmission until the expiry of the timer. The timer value may be predefined or preconfigured by the network.

According to one further alternative option, the UE 205 performs duplicate transmissions of PDCP PDUs once being activated, e.g., based on a received NACK, until the initial transmission of MAC PDU containing an original PDCP PDU was successfully received (ACK received) or alternatively N consecutive initial transmissions of MAC PDUs containing an original PDCP PDU were successfully received (ACK received for N consecutive PDCP PDUs). According to a further alternative option the network (e.g., RAN) explicitly signals the UE 205 when to stop/deactivate duplicate transmissions—once duplicate transmission has been enabled by the UE 205.

According to one further aspect of the first solution, network explicitly configures whether the UE 205 is allowed to autonomously enable duplication for selective packets, e.g., based upon HARQ feedback reception. Each radio bearer, e.g., UL DRB, which is configured for duplication may also configured with an IE/flag indicating whether selective duplication (aka "autonomous" duplication) is allowed or not. Such IE may be for example a Boolean value associated with an RB configured for duplication. According to one example, the RAN node, e.g., gNB 210, only allows the UE 205 autonomous enabling of duplication for those radio bearers requiring survival time support.

Figure 4:
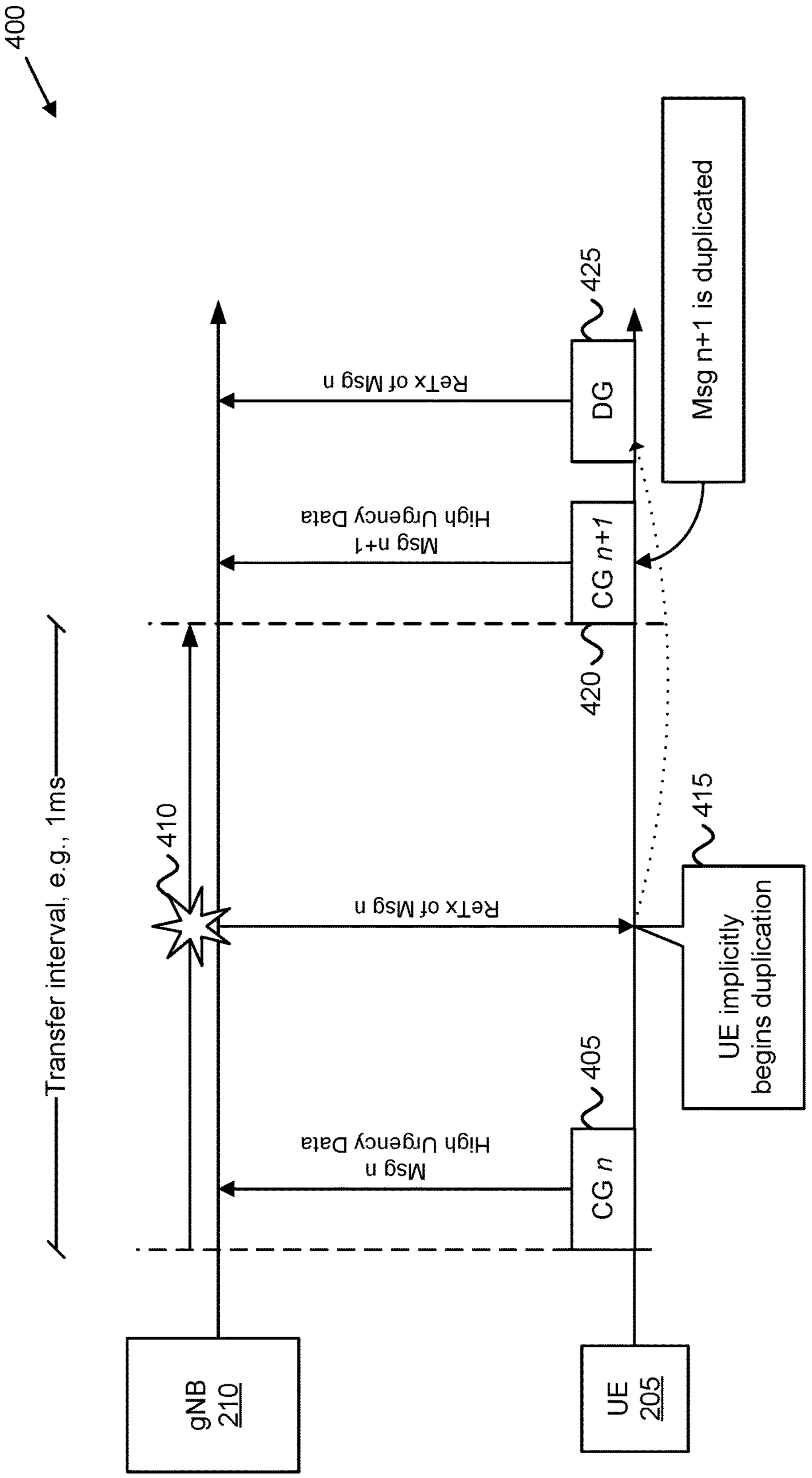
FIG. 4 is a diagram illustrating another embodiment of autonomous PDCP duplication.

FIG. 4 depicts UE-controlled PDCP duplication, according to embodiments of the disclosure. As noted above, in conventional systems PDCP duplication is activated/deactivated by means of MAC CE signaling from the gNB 210. However, the activation/deactivation of PDCP duplication by MAC CE signaling from network may not be fast enough for the NR I-IoT applications.

As depicted in FIG. 4, the UE 205 has an uplink grant corresponding to a first transmission opportunity 405 for a configured grant ("CG"). Here, the UE 205 generates a data packet (e.g., PDCP PDU) for transmission on the first uplink grant. The data packet is referred to as "Msg n" and may include high priority data.

In the depicted embodiment, the gNB 210 experiences unsuccessful reception 410 of the Msg n, and so sends a NACK, e.g., request for a retransmission, to the UE 205. Upon receiving a retransmission request, e.g., NACK, for the transmission of a MAC PDU carrying an "original" PDCP PDU of the primary LCH 315, the UE 205 enables duplicate transmissions (see block 415) for the PDCP PDU for which a retransmission is scheduled (i.e., dynamic grant ("DG") 425) and, optionally, for further subsequent PDCP PDUs according to one implementation of the first solution (i.e., Msg n+1 corresponding to second transmission opportunity 420 is duplicated).

Therefore, the UE 205 may be configured to autonomously enable PDCP duplication for selected packets. Note that the UE behavior of FIGS. 2 and 4 may be combined, so that the UE 205 activates a secondary LCH to send the pre-generated duplicate PDCP PDU for Msg n, in addition to activating PDCP duplication for the retransmission and subsequent PDCP PDUs.

According to a second embodiment, the UE 205 autonomously changes the LCH-to-cell restriction settings of the LCHs associated with a radio bearer configured for duplication, when duplication is selectively enabled by the UE 205. Here, the UE 205 may selectively enable PDCP duplication in order to increase the reliability of a HARQ retransmission and optionally for further subsequent packet transmissions as described in the first embodiment. For the carrier aggregation duplication case, cell restriction functionality was introduced in order to ensure that the same PDUs (duplicate PDU and original PDU) are not transmitted on the same carrier/cell thereby eliminating the diversity gain. The LCHs associated with a duplication radio bearer may be configured with an IE allowedServingCells indicating on which cells data of this logical channel can be transmitted.

When CA duplication is deactivated, i.e., the UE 205 doesn't transmit copies of a PDCP PDU over the secondary LCH(s), there is no restriction applied for the primary LCH, i.e., primary LCH can be transmitted on any configured/activated Serving cell. When the UE 205 selectively enables duplication, e.g., for a HARQ retransmissions, as described in the first embodiment the UE 205 selects according to the second embodiment the carrier/cells on which the duplicates of the secondary LCH(s) are transmitted such, that the duplicate PDCP/MAC PDU(s) and the "original" PDCP/MAC PDU don't end up on the same carrier/serving cell. Alternatively, the UE 205 may always apply the cell restriction configuration for the primary LCH even though duplication is not enabled/activated. In such a case, the UE 205 would use the configured cell restrictions for the secondary LCH(s) when the UE 205 enables duplication for a HARQ retransmission.

In various embodiments, the UE 205 doesn't consider the RLC data PDUs that are pending for initial transmission for the purpose of MAC buffer status reporting for the secondary LCH(s) of a duplication radio bearer when duplication is not enabled. In order to support selective duplication of packets, the UE 205 may duplicate each PDCP PDU and deliver it to the secondary LCH(s) where RLC PDUs are generated that are pending for initial transmission in order to allow the UE 205 enabling duplication for the HARQ retransmission case as described in the first embodiment. Here, however, the UE 205 does not report the pre-generated pending RLC PDUs for the purpose of Buffer Status Reporting as long as the UE 205 has not enabled duplication, i.e., because only data of the primary LCH is transmitted when duplication is disabled.

According to certain embodiments, the UE 205 selects the RLC entities/LCHs which are used for duplication, i.e., secondary LCH(s), among the set of configured LCHs associated with a duplication radio bearer. A radio bearer being configured for duplication may have a set of associated LCHs, but only a subset of them is used for duplication. When the UE 205 autonomously enables duplication for selected packets, e.g., for HARQ retransmissions, as described for example in the first embodiment, the UE 205 may according to this embodiment select the LCHs which are used for the duplication, i.e., the UE 205 selects the secondary LCHs.

As a consequence, the UE 205 submits the duplicated PDCP PDUs to the selected secondary LCHs even for cases when duplication is not enabled as described in the first embodiment. Because the UE 205 is autonomously enabling duplication according to some predefined criteria, e.g., based on HARQ NACK for a TB, the UE 205 should also decide on which LCHs to send the duplicates. In an alternative solution the LCHs used for the transmission of the duplicate PDCP PDUs are preconfigured by network.

According to a certain embodiment, PDCP duplication is selectively enabled by explicit network signaling. The duplication can be according to this embodiment also enabled for HARQ retransmissions. In one implementation, the network node, e.g., gNB 210, enables duplication by means of a PDCCH (e.g., DCI) scheduling a HARQ retransmission of an UL TB. In order to allow the duplication of a retransmission of a PDCP PDU, the UE 205 duplicates each PDCP SDU/PDU of a DRB configured for duplication at the PDCP transmitting entity and submits the duplicate(s) to the at least one additional secondary logical channel even though duplication has not been enabled as described in the first embodiment. the UE 205 further generates RLC PDU(s) upon receiving the duplicate PDCP PDUs from the PDCP transmitting entity at the RLC entity(s) associated with the one or more secondary LCHs considered for duplication and stores the generated RLC PDUs at the RLC transmitting entity. the UE 205 behavior will be similar to the implementations described for the first embodiment with the difference that duplication is enabled by network control, e.g., DCI scheduling an UL HARQ retransmission.

In various embodiments, the UE 205 may discard the RLC PDUs carrying the duplicates on the secondary LCHs which are pending for the initial transmission at the corresponding RLC entities upon reception of an ACK correspondingly when the successful transmission of a TB was indicated by the gNB 210, e.g., DCI with toggled NDI. In one implementation of this embodiment, one bit in the DCI scheduling an UL HARQ retransmission indicates whether the UE 205 shall enable respectively disable duplication. Alternatively, one reserved codepoint of an existing field in a DCI scheduling uplink transmissions or a combination of fields in the DCI indicate to the UE 205 to enable/disable duplication. As described in above embodiments the UE 205 may enable duplication—upon reception of the network signaling ordering the UE 205 to enable duplication—for only one packet, e.g., the TB for which network schedules a retransmission, or for a predefined time period respectively a predefined number of packets. In one alternative implementation of this embodiment network may also indicate to the UE 205 to enable respectively disable duplication by means of a PDCCH (DCI) scheduling an initial UL transmission. This indication may be signaling by one additional bit in the UL DCI or by one reserved codepoint of an existing field in a UL DCI or a combination of fields in the UL DCI.

According to some embodiments, the UE 205 adapts the transmission power respectively transmit power control parameters for UL HARQ retransmissions. In order to increase the reliability of HARQ retransmissions and thereby avoiding a situation that the survival time exceeds which would in turn trigger the application to transition the status of the communication service into a down state, the UE 205 may according to this embodiment transmit the HARQ retransmission(s) with an increased transmit power. In one implementation of this embodiment, the UE 205 may apply a different set of uplink power control parameters for a HARQ retransmission on PUSCH compared to an initial HARQ transmissions. In one example, the UE 205 may use a different $P_0$ value for HARQ retransmissions in order to increase the reliability of retransmission. $P_0$ denotes the target received power. According to another implementation, the UE 205 may use a different alpha value—denoting the pathloss compensation factor—for HARQ retransmissions. According to another alternative implementation the UE 205 may apply a power ramping step for a HARQ retransmission on PUSCH. The gNB 210 may configure the power ramping step size similar to the power ramping configuration for PRACH.

According to one implementation of this embodiment, the gNB 210 configures power control parameters or set of power control parameters, e.g., different power control parameters for initial and retransmissions, for certain logical channels. Whenever data of LCHs for which dedicated power control parameters are configured are contained in a TB, the UE 205 applies the LCH-specific power control parameters for the calculation of the PUSCH transmissions power. In case no data of an LCH for which LCH-specific power control parameters are configured is contained in a TB, the UE 205 applies the common power control parameters configured for PUSCH transmissions.

According to another alternative implementation the UE 205 enables multi-panel transmission according to some predefined criteria, e.g., upon reception of a NACK. By using multi-panel transmissions, the UE 205 may benefit from the additional (space) diversity gain. This may further increase the reliability of the transmissions thereby avoiding a situation that the survival time exceeds which would in turn trigger the application to transition the status of the communication service into a down state.

All above described embodiments have the target to increase the transmission reliability in order to avoid a situation that the survival time exceeds which would in turn trigger the application to transition the status of the communication service into a down state. The techniques described in above embodiments are equally applicable for the situation when the communication service is a down state, with the aim to quickly recover and bring the communication service status back to the UP state.

Therefore, and according to another embodiment, the UE 205 increases the transmission reliability by e.g., enabling duplicate transmissions or adapting power control parameters as described in the above embodiments as soon as survival time is exceeded. According to one implementation of the embodiment the UE 205 and/or the gNB 210 are configured with the survival time associated with a QoS flow respectively radio bearer. The UPF and/or AMF may signal to the gNB 210 the survival time associated with a QoS flow.

In certain embodiments, the UE 205 may be configured with the survival of a radio bearer by the gNB 210. Here, the gNB 210 may order to the UE 205 based on the status of the survival timer, e.g., when expired, to increase the transmission reliability by for example enabling duplicate transmissions or multi-panel transmissions. Alternatively, the UE 205 may autonomously increase the reliability of transmissions by e.g., enabling duplication or multi-panel transmissions, e.g., based on the configured survival time. In one implementation of the embodiment the UE 205 informs the gNB 210 when the UE 205 increased the reliability of transmissions by e.g., enabling PDCP duplication or power ramping, and similarly when again disabling the techniques, e.g., disabling duplication or power ramping etc.

Figure 5:
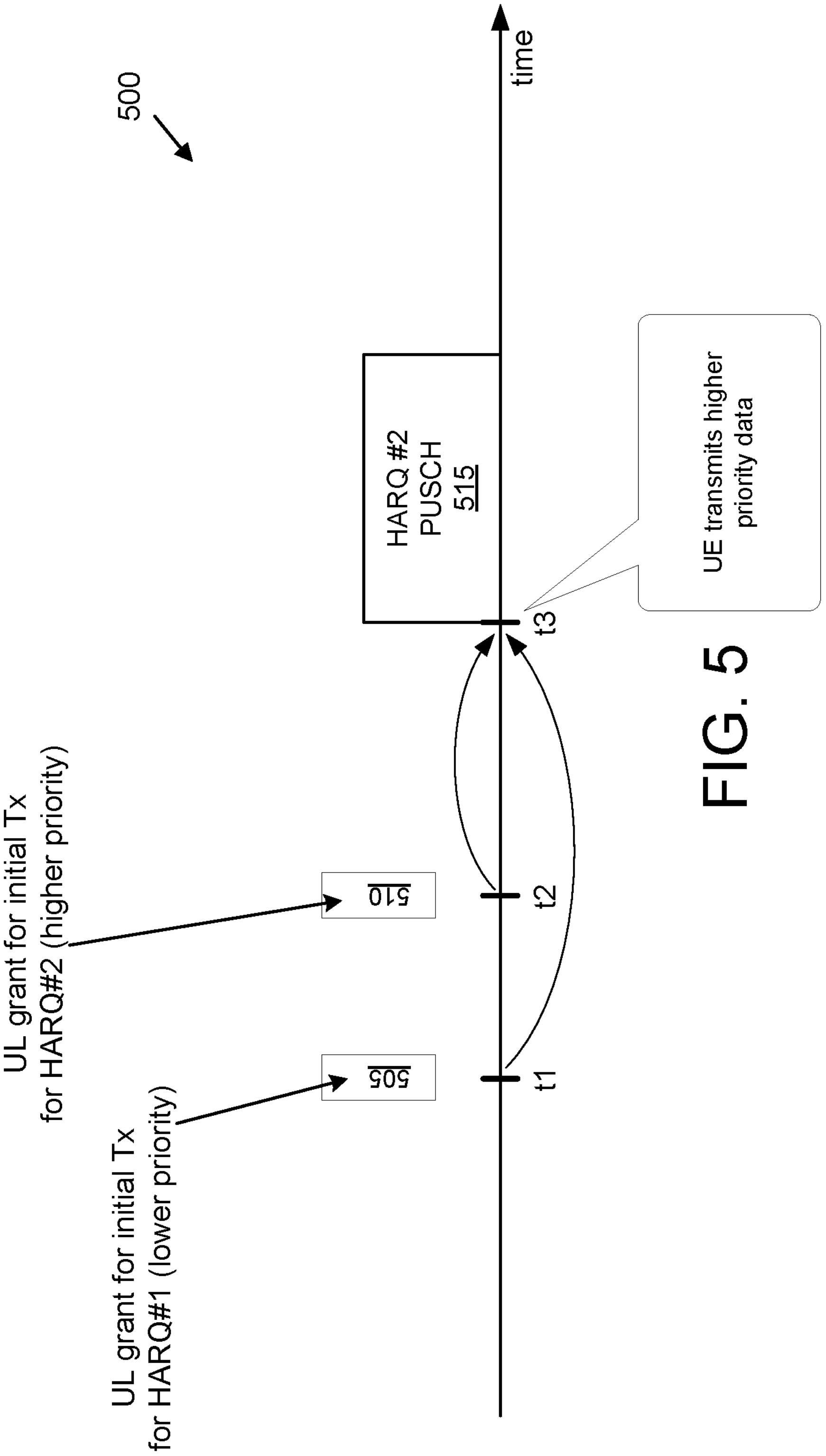
FIG. 5 is a block diagram illustrating one embodiment of uplink grant preemption.

FIG. 5 depicts a timing diagram for a UL preemption scenario 500, according to embodiments of the disclosure. The UL preemption scenario 500 may be implemented at a UE 205, such as the remote unit 105 and/or the UE 205. At time 't1', the UE 205 receives an allocation of uplink resources (e.g., PUSCH resources) via PDCCH (e.g., first UL grant 505 is received at time 't1'). In the embodiment of FIG. 5, it is assumed that the scheduled resources are for normal priority data and are associated with an initial transmission for a first HARQ process (HARQ #1). Here, the allocation of uplink resources may be a dynamic grant received via DCI. As depicted, the allocated uplink resources (PUSCH resources 515) begin at time 't3'. Even though FIG. 5 shows the exemplary preemption scenario where a dynamic uplink grant, i.e., PUSCH resources scheduled by PDCCH (DCI), is preempted by another higher priority dynamic uplink, it should be noted that also a configured uplink grant can be preempted by a higher priority uplink grant.

At time 't2' (e.g., after receiving the allocation of uplink resources, but before time 't3') high urgency/critical data arrives in the UE's buffer (e.g., second UL grant 510 is received at time 't1'). The arrival of the high urgency/critical data causes the UE 205 to preempt the lower priority data and instead transmit the high urgency/critical data at time 't3' using the previously scheduled PUSCH resources 515.

According to one further embodiment, the UE 205 triggers internally—without network involvement—a HARQ retransmission for a HARQ process storing a MAC PDU in the associated HARQ buffer which was preempted/dropped by some higher priority transmission. UL preemption is one mechanism considered for the NR I-IoT in order to ensure that the QoS requirements of a high priority low latency service, e.g., URLLC, can be met in case that the UE 205 has already been allocated with some uplink resources for a lower priority service, e.g., eMBB or MTC. If a later processed grant has a higher priority LCH and the MAC PDU of an earlier grant has been already assembled, two MAC PDUs for two grants are generated by the MAC layer and submitted to the PHY layer. Here, the UE 205, e.g., PHY layer, decides to transmit only the higher priority MAC PDU and drops the transmission of the lower priority MAC PDU.

Once the UE 205 decides to pre-empt an ongoing PUSCH transmission with a new higher priority grant, the data contained in the generated but pre-empted MAC PDU may be lost. Therefore, some special handling for such generated but preempted MAC PDU is necessary. In case the pre-empted/dropped transmission is a configured grant, the UE 205 (i.e., MAC layer 330) will assume a successful reception of the MAC PDU if no retransmission UL grant is received from the gNB 210 while the ConfiguredGrantTimer is running. However, the gNB 210 is not aware that the UE 205 pre-empted a MAC PDU generated according to a configured grant because this is some the UE 205 internal procedure. Hence, the gNB 210 may not send a UL retransmission grant for the HARQ process which stores the pre-empted MAC PDU. As a consequence, the data contained in the pre-empted MAC PDU will be lost.

In order to avoid a loss of data the UE 205 triggers internally a HARQ retransmission of the pre-empted MAC PDU. According to one implementation of this embodiment PHY may indicate—upon dropping/preempting the MAC PDU—a NACK to the HARQ process storing the preempted MAC PDU. The UE 205 may perform a retransmission of the preempted MAC PDU on the next available configured grant resources for that HARQ process. According to another implementation of this embodiment the UE 205 stops the ConfiguredGrantTimer associated with the HARQ process of the preempted MAC PDU.

Figure 6:
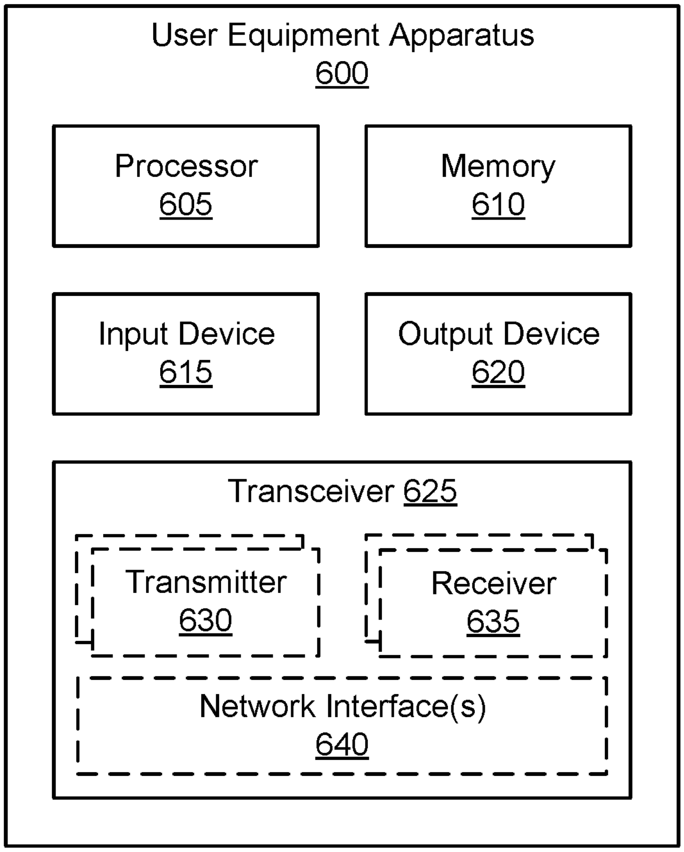
FIG. 6 is a diagram illustrating one embodiment of a user equipment apparatus that may be used for selective packet duplication.

FIG. 6 depicts a user equipment apparatus 600 that may be used for selective duplication of high urgency ultra-reliable data transmissions, according to embodiments of the disclosure. In various embodiments, the user equipment apparatus 600 is used to implement one or more of the solutions described above. The user equipment apparatus 600 may be one embodiment of the UE 205, described above. Furthermore, the user equipment apparatus 600 may include a processor 605, a memory 610, an input device 615, an output device 620, and a transceiver 625. In some embodiments, the input device 615 and the output device 620 are combined into a single device, such as a touchscreen. In certain embodiments, the user equipment apparatus 600 may not include any input device 615 and/or output device 620. In various embodiments, the user equipment apparatus 600 may include one or more of: the processor 605, the memory 610, and the transceiver 625, and may not include the input device 615 and/or the output device 620.

The processor 605, in one embodiment, may include any known controller capable of executing computer-readable instructions and/or capable of performing logical operations. For example, the processor 605 may be a microcontroller, a microprocessor, a central processing unit ("CPU"), a graphics processing unit ("GPU"), an auxiliary processing unit, a field programmable gate array ("FPGA"), or similar programmable controller. In some embodiments, the processor 605 executes instructions stored in the memory 610 to perform the methods and routines described herein. The processor 605 is communicatively coupled to the memory 610, the input device 615, the output device 620, and the transceiver 625.

In various embodiments, the processor 605 duplicates a PDCP PDU prior to detecting an activation trigger for PDCP duplication. The processor 605 may store the duplicated PDCP PDU, e.g., in a buffer, without transmitting them. Additionally, the transceiver 625 transmits the original PDCP PDU.

In some embodiments, the processor 605 discards the duplicated PDCP PDU without transmitting, e.g., in response to receiving a HARQ ACK corresponding to the original PDCP PDU. In other embodiments, the processor 605 transmits the duplicated PDCP via the transceiver 625, e.g., in response to receiving a NACK for the original PDCP PDU.

In certain embodiments, the processor 605 controls the transceiver 625 to retransmit the original PDCP in response to receiving the NACK. In various embodiments, the original transmission (and the retransmission) is sent on a primary logical channel and the duplicated PDCP is sent on a secondary logical channel different than the primary logical channel. In certain embodiments, the processor 605 renumbers RLC sequence numbers for PDUs in the secondary logical channel in response to discarding the duplicated PDCP PDU.

In certain embodiments, the processor 605 ignores the duplicated PDCP PDU for the purpose of buffer status reporting while the activation trigger for PDCP duplication is not detected. However, in response to detecting the activation trigger for PDCP duplication, the processor 605 stops ignoring the duplicated PDCP PDU for the purpose of buffer status reporting. In various embodiments, receipt of the NACK triggers activation of PDCP duplication.

The memory 610, in one embodiment, is a computer readable storage medium. In some embodiments, the memory 610 includes volatile computer storage media. For example, the memory 610 may include a RAM, including dynamic RAM ("DRAM"), synchronous dynamic RAM ("SDRAM"), and/or static RAM ("SRAM"). In some embodiments, the memory 610 includes non-volatile computer storage media. For example, the memory 610 may include a hard disk drive, a flash memory, or any other suitable non-volatile computer storage device. In some embodiments, the memory 610 includes both volatile and non-volatile computer storage media.

In some embodiments, the memory 610 stores data related to autonomous packet duplication and retransmission. For example, the memory 610 may store original PDCP PDUs, duplicated PDCP PDUs, buffer statuses, network statuses, HARQ feedback information, and the like. In certain embodiments, the memory 610 also stores program code and related data, such as an operating system or other controller algorithms operating on the user equipment apparatus 600.

The input device 615, in one embodiment, may include any known computer input device including a touch panel, a button, a keyboard, a stylus, a microphone, or the like. In some embodiments, the input device 615 may be integrated with the output device 620, for example, as a touchscreen or similar touch-sensitive display. In some embodiments, the input device 615 includes a touchscreen such that text may be input using a virtual keyboard displayed on the touchscreen and/or by handwriting on the touchscreen. In some embodiments, the input device 615 includes two or more different devices, such as a keyboard and a touch panel.

The output device 620, in one embodiment, is designed to output visual, audible, and/or haptic signals. In some embodiments, the output device 620 includes an electronically controllable display or display device capable of outputting visual data to a user. For example, the output device 620 may include, but is not limited to, an LCD display, an LED display, an OLED display, a projector, or similar display device capable of outputting images, text, or the like to a user. As another, non-limiting, example, the output device 620 may include a wearable display separate from, but communicatively coupled to, the rest of the user equipment apparatus 600, such as a smart watch, smart glasses, a heads-up display, or the like. Further, the output device 620 may be a component of a smart phone, a personal digital assistant, a television, a table computer, a notebook (laptop) computer, a personal computer, a vehicle dashboard, or the like.

In certain embodiments, the output device 620 includes one or more speakers for producing sound. For example, the output device 620 may produce an audible alert or notification (e.g., a beep or chime). In some embodiments, the output device 620 includes one or more haptic devices for producing vibrations, motion, or other haptic feedback. In some embodiments, all or portions of the output device 620 may be integrated with the input device 615. For example, the input device 615 and output device 620 may form a touchscreen or similar touch-sensitive display. In other embodiments, the output device 620 may be located near the input device 615.

As discussed above, the transceiver 625 communicates with one or more network functions of a mobile communication network via one or more access networks. The transceiver 625 operates under the control of the processor 605 to transmit messages, data, and other signals and also to receive messages, data, and other signals. For example, the processor 605 may selectively activate the transceiver 625 (or portions thereof) at particular times in order to send and receive messages.

The transceiver 625 may include one or more transmitters 630 and one or more receivers 635. Although only one transmitter 630 and one receiver 635 are illustrated, the user equipment apparatus 600 may have any suitable number of transmitters 630 and receivers 635. Further, the transmitter(s) 630 and the receiver(s) 635 may be any suitable type of transmitters and receivers. Additionally, the transceiver 625 may support at least one network interface 640. Here, the at least one network interface 640 facilitates communication with a RAN node, such as an eNB or gNB, for example using the "Uu" interface. Additionally, the at least one network interface 640 may include an interface used for communications with one or more network functions in the mobile core network, such as a UPF, an AMF, and/or a SMF.

In one embodiment, the transceiver 625 includes a first transmitter/receiver pair used to communicate with a mobile communication network over licensed radio spectrum and a second transmitter/receiver pair used to communicate with a mobile communication network over unlicensed radio spectrum. In certain embodiments, the first transmitter/receiver pair used to communicate with a mobile communication network over licensed radio spectrum and the second transmitter/receiver pair used to communicate with a mobile communication network over unlicensed radio spectrum may be combined into a single transceiver unit, for example a single chip performing functions for use with both licensed and unlicensed radio spectrum. In some embodiments, the first transmitter/receiver pair and the second transmitter/receiver pair may share one or more hardware components. For example, certain transceivers 625, transmitters 630, and receivers 635 may be implemented as physically separate components that access a shared hardware resource and/or software resource, such as for example, the network interface 640.

In various embodiments, one or more transmitters 630 and/or one or more receivers 635 may be implemented and/or integrated into a single hardware component, such as a multi-transceiver chip, a system-on-a-chip, an application-specific integrated circuit ("ASIC"), or other type of hardware component. In certain embodiments, one or more transmitters 630 and/or one or more receivers 635 may be implemented and/or integrated into a multi-chip module. In some embodiments, other components such as the network interface 640 or other hardware components/circuits may be integrated with any number of transmitters 630 and/or receivers 635 into a single chip. In such embodiment, the transmitters 630 and receivers 635 may be logically configured as a transceiver 625 that uses one more common control signals or as modular transmitters 630 and receivers 635 implemented in the same hardware chip or in a multi-chip module.

Figure 7:
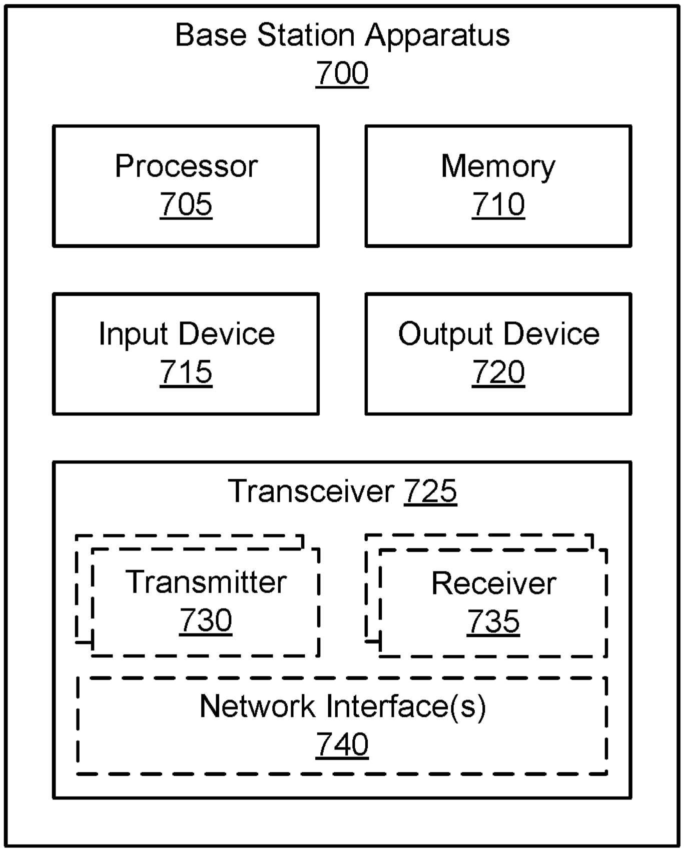
FIG. 7 is a diagram illustrating one embodiment of a base station apparatus that may be used for selective packet duplication.

FIG. 7 depicts a base station apparatus 700 that may be used for selectively deactivating a bandwidth part, according to embodiments of the disclosure. The base station apparatus 700 may be one embodiment of the base unit 110, described above. Furthermore, the base station apparatus 700 may include a processor 705, a memory 710, an input device 715, an output device 720, and a transceiver 725. In some embodiments, the input device 715 and the output device 720 are combined into a single device, such as a touchscreen. In certain embodiments, the base station apparatus 700 may not include any input device 715 and/or output device 720. In various embodiments, the base station apparatus 700 may include one or more of: the processor 705, the memory 710, and the transceiver 725, and may not include the input device 715 and/or the output device 720.

The processor 705, in one embodiment, may include any known controller capable of executing computer-readable instructions and/or capable of performing logical operations. For example, the processor 705 may be a microcontroller, a microprocessor, a CPU, a GPU, an auxiliary processing unit, a FPGA, or similar programmable controller. In some embodiments, the processor 705 executes instructions stored in the memory 710 to perform the methods and routines described herein. The processor 705 is communicatively coupled to the memory 710, the input device 715, the output device 720, and the transceiver 725.

In various embodiments, the processor 705 controls the base station apparatus 700 to perform the above describe behaviors. In some embodiments, the base station apparatus 700 sends to a UE (e.g., via the transceiver 725) first uplink grant associated with a first HARQ process and a second uplink grant associated with a second HARQ process. Here, the first uplink grant may be a configured grant and the second uplink grant has overlapping PUSCH resources with the first uplink grant. Moreover, the second uplink grant has a higher priority than the first uplink grant. Accordingly, the UE may transmit according to the second uplink grant and may autonomously trigger retransmission, as described above.

In some embodiments, the base station apparatus 700 sends to a UE (e.g., via the transceiver 725) a trigger for PDCP PDU duplication, as described above. Thereafter, the transceiver 725 may receive duplicated PDCP PDUs from the UE, e.g., via multiple logical channels and/or multiple serving cells, as described herein.

The memory 710, in one embodiment, is a computer readable storage medium. In some embodiments, the memory 710 includes volatile computer storage media. For example, the memory 710 may include a RAM, including dynamic RAM ("DRAM"), synchronous dynamic RAM ("SDRAM"), and/or static RAM ("SRAM"). In some embodiments, the memory 710 includes non-volatile computer storage media. For example, the memory 710 may include a hard disk drive, a flash memory, or any other suitable non-volatile computer storage device. In some embodiments, the memory 710 includes both volatile and non-volatile computer storage media.

In some embodiments, the memory 710 stores data related to autonomous packet duplication and retransmission. For example, the memory 710 may store UL grants, UE configurations, HARQ processes, and the like. In certain embodiments, the memory 710 also stores program code and related data, such as an operating system or other controller algorithms operating on the remote unit 105.

The input device 715, in one embodiment, may include any known computer input device including a touch panel, a button, a keyboard, a stylus, a microphone, or the like. In some embodiments, the input device 715 may be integrated with the output device 720, for example, as a touchscreen or similar touch-sensitive display. In some embodiments, the input device 715 includes a touchscreen such that text may be input using a virtual keyboard displayed on the touch-screen and/or by handwriting on the touchscreen. In some embodiments, the input device 715 includes two or more different devices, such as a keyboard and a touch panel.

The output device 720, in one embodiment, is designed to output visual, audible, and/or haptic signals. In some embodiments, the output device 720 includes an electronically controllable display or display device capable of outputting visual data to a user. For example, the output device 720 may include, but is not limited to, an LCD display, an LED display, an OLED display, a projector, or similar display device capable of outputting images, text, or the like to a user. As another, non-limiting, example, the output device 720 may include a wearable display separate from, but communicatively coupled to, the rest of the base station apparatus 700, such as a smart watch, smart glasses, a heads-up display, or the like. Further, the output device 720 may be a component of a smart phone, a personal digital assistant, a television, a table computer, a notebook (laptop) computer, a personal computer, a vehicle dashboard, or the like.

In certain embodiments, the output device 720 includes one or more speakers for producing sound. For example, the output device 720 may produce an audible alert or notification (e.g., a beep or chime). In some embodiments, the output device 720 includes one or more haptic devices for producing vibrations, motion, or other haptic feedback. In some embodiments, all or portions of the output device 720 may be integrated with the input device 715. For example, the input device 715 and output device 720 may form a touchscreen or similar touch-sensitive display. In other embodiments, the output device 720 may be located near the input device 715.

The transceiver 725 includes at least transmitter 730 and at least one receiver 735. One or more transmitters 730 may be used to communicate with the UE, as described herein. Similarly, one or more receivers 735 may be used to communicate with other network functions in the PLMN, as described herein. Although only one transmitter 730 and one receiver 735 are illustrated, the base station apparatus 700 may have any suitable number of transmitters 730 and receivers 735. Further, the transmitter(s) 725 and the receiver(s) 730 may be any suitable type of transmitters and receivers.

Figure 8:
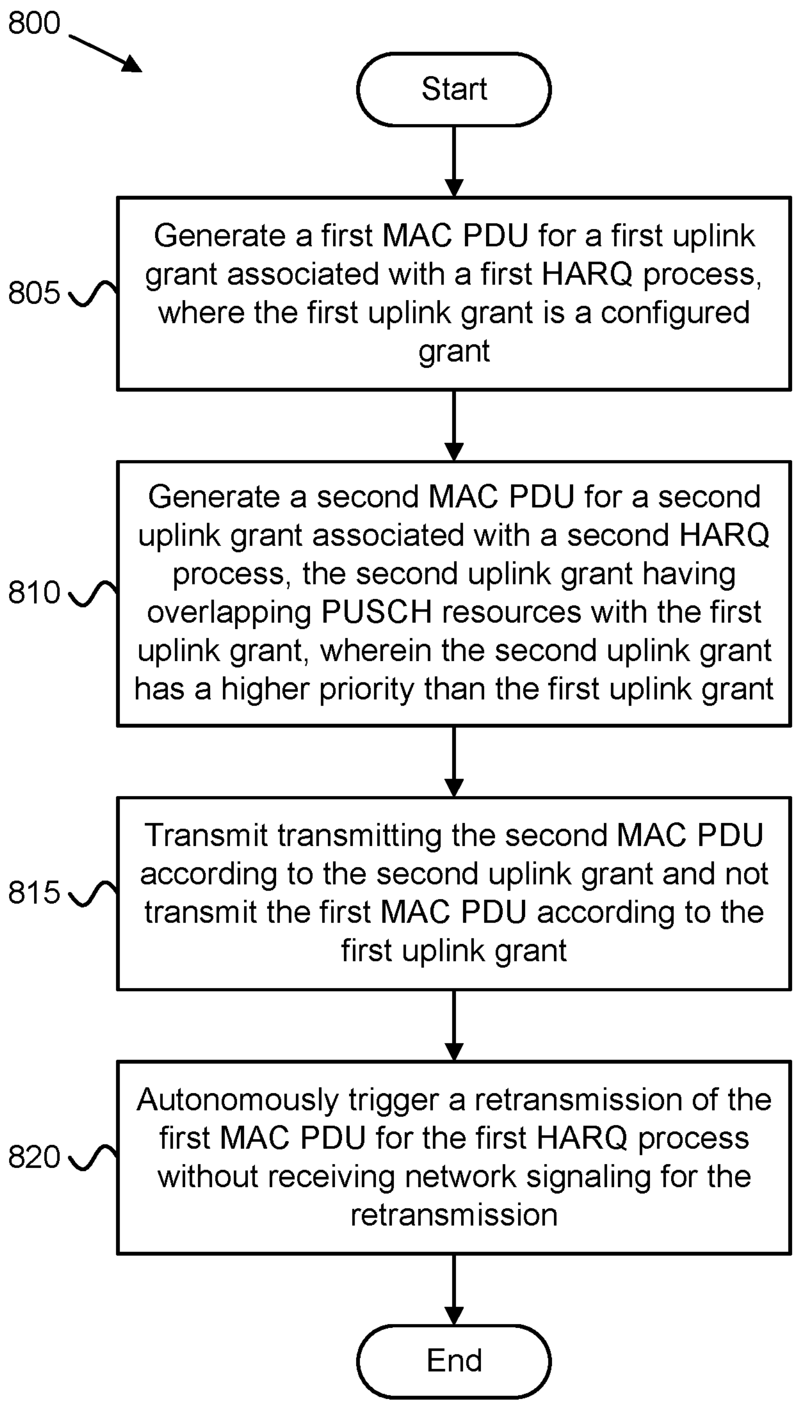
FIG. 8 is a flowchart diagram illustrating one embodiment of a method that may be used for uplink grant preemption.

FIG. 8 depicts one embodiment of a method 800 for autonomous packet retransmission, according to embodiments of the disclosure. In various embodiments, the method 800 is performed by a UE, such as the remote unit 105, the UE 205, and/or the user equipment apparatus 600, described above. In some embodiments, the method 800 is performed by a processor, such as a microcontroller, a microprocessor, a CPU, a GPU, an auxiliary processing unit, a FPGA, or the like.

The method 800 begins and generates 805 at the UE a first MAC PDU for a first uplink grant associated with a first HARQ process. Here, the first uplink grant is a configured grant. The method 800 include generating 810 at the UE a second MAC PDU for a second uplink grant associated with a second HARQ process. Here, the second uplink grant has overlapping PUSCH resources with the first uplink grant. Moreover, the second uplink grant has a higher priority than the first uplink grant.

The method 800 includes transmitting 815 the second MAC PDU according to the second uplink grant and not transmitting the first MAC PDU according to the first uplink grant. The method 800 includes autonomously triggering 820 a retransmission of the first MAC PDU for the first HARQ process. Here, autonomously triggering the retransmission comprises triggering the retransmission without receiving network signaling for the retransmission. The method 800 ends.

Figure 9:
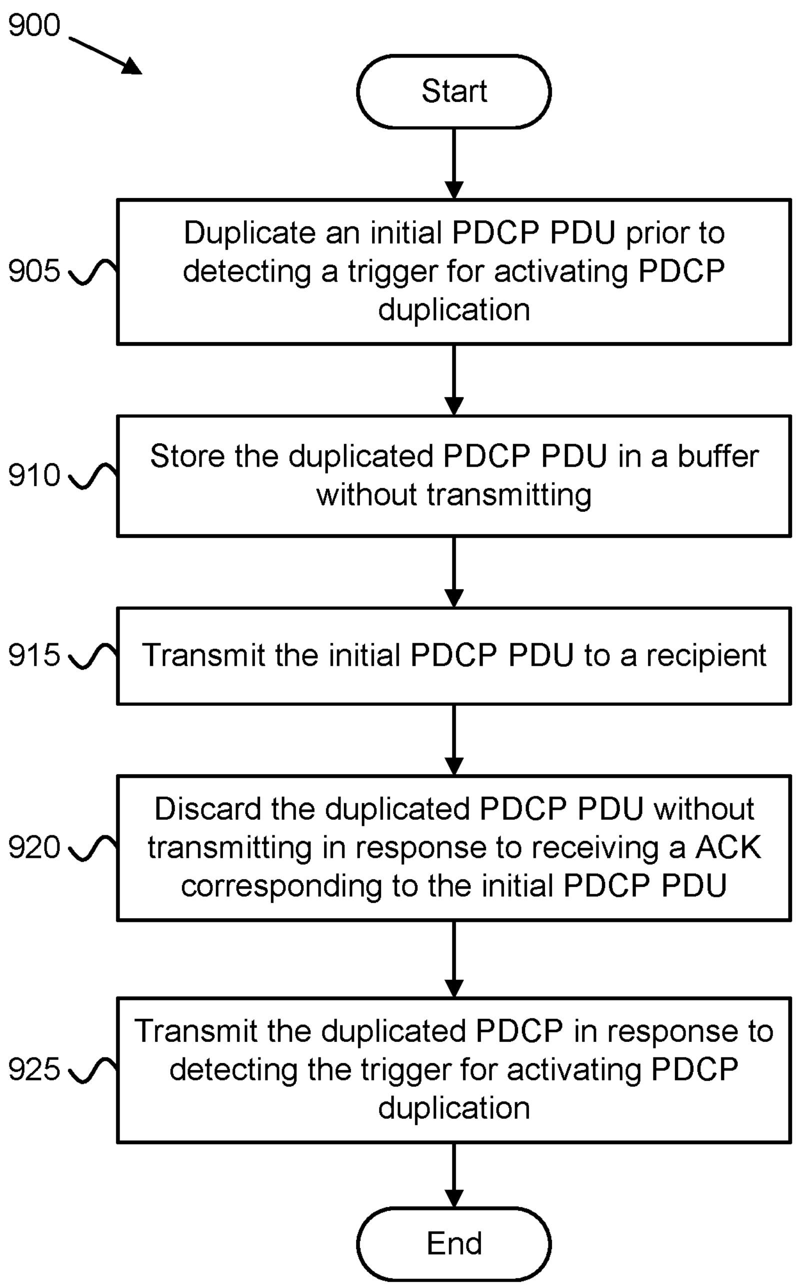
FIG. 9 is a flowchart diagram illustrating one embodiment of a method that may be used for selective packet duplication.

FIG. 9 depicts one embodiment of a method 900 for autonomous packet duplication and retransmission, according to embodiments of the disclosure. In various embodiments, the method 900 is performed by a UE, such as the remote unit 105, the UE 205, and/or the user equipment apparatus 600, described above. In some embodiments, the method 900 is performed by a processor, such as a micro-controller, a microprocessor, a CPU, a GPU, an auxiliary processing unit, a FPGA, or the like.

The method 900 begins and duplicate 905 at the UE an initial PDCP PDU prior to detecting a trigger for activating PDCP duplication. The method 900 includes storing 910 at the UE the duplicated PDCP PDU in a buffer without transmitting. The method 900 includes transmitting 915 the initial PDCP PDU to a recipient (e.g., a RAN node, such as a gNB). The method 900 includes discarding 920 the duplicated PDCP PDU without transmitting in response to receiving an ACK corresponding to the initial PDCP PDU. The method 900 includes transmitting 925 the duplicated PDCP PDU in response to detecting the trigger for activating PDCP duplication. The method 900 ends.

Disclosed herein is a first apparatus for managing uplink preemption, according to embodiments of the disclosure. The first apparatus may be implemented by a UE, such as the remote unit 105, the UE 205, and/or the user equipment apparatus 600. The first apparatus includes a processor that generates a first PDU for a first uplink grant associated with a first HARQ process and generates a second MAC PDU for a second uplink grant associated with a second HARQ process. Here, the first uplink grant is a configured grant and the second uplink grant has overlapping PUSCH resources with the first uplink grant. Moreover, the second uplink grant has a higher priority than the first uplink grant. The first apparatus includes a transceiver that transmits the second MAC PDU according to the second uplink grant and does not transmit the first MAC PDU according to the first uplink grant. Additionally, the processor autonomously triggers a retransmission of the first MAC PDU for the first HARQ process without receiving network signaling for the retransmission.

In some embodiments, autonomously triggering the retransmission of the first MAC PDU for the first HARQ process includes transmitting the first MAC PDU on a subsequent uplink configured grant resource of the first uplink grant on the first HARQ process.

In some embodiments, autonomously triggering the retransmission of the first MAC PDU comprises stopping a timer associated with a HARQ process of the first MAC PDU. In some embodiments, the second uplink grant is received later than the first uplink grant. In various embodiments, the first HARQ process and the second HARQ process correspond to different HARQ processes.

Disclosed herein is a second apparatus for managing packet duplication, according to embodiments of the disclosure. The second apparatus may be implemented by a UE, such as the remote unit 105, the UE 205, and/or the user equipment apparatus 600. The second apparatus includes a processor that duplicates an initial PDCP PDU prior to detecting a trigger for activating PDCP duplication and stores the duplicated PDCP PDU in a buffer without transmitting. The second apparatus includes a transceiver that transmits the initial PDCP PDU to a recipient (e.g., a RAN node, such as a gNB) and transmits the duplicated PDCP PDU in response to detecting the trigger for activating PDCP duplication. Moreover, in response to the transceiver receiving a positive acknowledgement ("ACK") corresponding to the initial PDCP PDU, the processor discards the duplicated PDCP PDU without transmitting.

In some embodiments, the trigger for activating PDCP duplication comprises receiving a predetermined number of negative acknowledgement ("NACK") from the recipient. In some embodiments, the trigger for activating PDCP duplication comprises receiving DCI scheduling a retransmission of the initial PDCP PDU. In some embodiments, receipt of a NACK for the initial PDCP PDU triggers activation of PDCP duplication.

In some embodiments, the transceiver retransmits the initial PDCP PDU in response to receiving a NACK for the initial PDCP PDU. In such embodiments, the initial PDCP PDU and its retransmission may be sent on a primary logical channel, while the duplicated PDCP PDU may be sent on a secondary logical channel. In certain embodiments, the processor submits the duplicated PDCP PDU to an RLC entity associated with the secondary logical channel prior to detecting the trigger for activating PDCP duplication. In certain embodiments, the processor renumbers RLC sequence numbers for PDUs in the secondary logical channel in response to discarding the duplicated PDCP PDU.

In some embodiments, the second apparatus is configured with multiple serving cells. In such embodiments, transmitting the initial PDCP PDU may include transmitting on a first serving cell, while transmitting the duplicated PDCP PDU includes transmitting on a second serving cell different than the first serving cell. In some embodiments, the processor ignores the duplicated PDCP PDU for the purpose of buffer status reporting while the trigger for activating PDCP duplication is not detected. In some embodiments, transmitting the duplicated PDCP PDU comprises transmitting with increased power compared to the initial transmission.

Disclosed herein is a first method for managing uplink preemption, according to embodiments of the disclosure. The first method may be performed by a UE, such as the remote unit 105, the UE 205, and/or the user equipment apparatus 600. The first method includes generating—at the UE—a first MAC PDU for a first uplink grant associated with a first HARQ process and generating at the UE—a second MAC PDU for a second uplink grant associated with a second HARQ process Here, the first uplink grant is a configured grant and the second uplink grant has overlapping PUSCH resources with the first uplink grant. Moreover, the second uplink grant has a higher priority than the first uplink grant. The first method also includes transmitting the second MAC PDU according to the second uplink grant and not transmitting the first MAC PDU according to the first uplink grant. The first method further includes autonomously triggering a retransmission of the first MAC PDU for the first HARQ process. Here, autonomously triggering the retransmission comprises triggering the retransmission without receiving network signaling for the retransmission.

In some embodiments, autonomously triggering the retransmission of the first MAC PDU for the first HARQ process includes transmitting the first MAC PDU on a subsequent uplink configured grant resource of the first uplink grant on the first HARQ process.

In some embodiments, autonomously triggering the retransmission of the first MAC PDU comprises stopping a timer associated with a HARQ process of the first MAC PDU. In some embodiments, the second uplink grant is received later than the first uplink grant. In various embodiments, the first HARQ process and the second HARQ process correspond to different HARQ processes.

Disclosed herein is a second method for managing packet duplication, according to embodiments of the disclosure. The second method may be performed by a UE, such as the remote unit 105, the UE 205, and/or the user equipment apparatus 600. The second method includes duplicating—at the UE—an initial PDCP PDU prior to detecting a trigger for activating PDCP duplication and storing—at the UE—the duplicated PDCP PDU in a buffer without transmitting. The second method includes transmitting the initial PDCP PDU to a recipient (e.g., a RAN node, such as a gNB). The second method includes discarding the duplicated PDCP PDU without transmitting in response to receiving a positive acknowledgement ("ACK") corresponding to the initial PDCP PDU and transmitting the duplicated PDCP PDU in response to detecting the trigger for activating PDCP duplication.

In some embodiments, the trigger for activating PDCP duplication comprises receiving a predetermined number of negative acknowledgement ("NACK") from the recipient. In some embodiments, the trigger for activating PDCP duplication comprises receiving DCI scheduling a retransmission of the initial PDCP PDU. In some embodiments, receipt of a NACK for the initial PDCP PDU triggers activation of PDCP duplication.

In some embodiments, the second method includes retransmitting the initial PDCP PDU in response to receiving a NACK for the initial PDCP PDU. In such embodiments, the initial transmission and the retransmission may be sent on a primary logical channel, while the duplicated PDCP PDU may be sent on a secondary logical channel. In certain embodiments, the second method includes submitting the duplicated PDCP PDU to an RLC entity associated with the secondary logical channel prior to prior to detecting the trigger for activating PDCP duplication. In certain embodiments, the second method includes renumbering RLC sequence numbers for PDUs in the secondary logical channel in response to discarding the duplicated PDCP PDU.

In some embodiments, the UE is configured with multiple serving cells. In such embodiments, transmitting the initial PDCP PDU may include transmitting on a first serving cell and while transmitting the duplicated PDCP PDU may include transmitting on a second serving cell different than the first serving cell. In some embodiments, the duplicated PDCP PDU is ignored for the purpose of buffer status reporting while the trigger for activating PDCP duplication is not detected. In some embodiments, transmitting the duplicated PDCP PDU comprises transmitting with increased power compared to the initial transmission.

Embodiments may be practiced in other specific forms. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

The invention claimed is:

1. A user equipment ("UE") for wireless communication, comprising:

a memory; and a processor coupled with the memory and configured to cause the UE to:

generate a first medium access control ("MAC") protocol data unit ("PDU") for a first uplink grant associated with an initial transmission for a first hybrid automatic repeat request ("HARQ") process, wherein the first uplink grant is a configured grant, wherein physical uplink shared channel ("PUSCH") resources corresponding to the first uplink grant are not dynamically scheduled, and wherein the PUSCH resources are not granted by Downlink Control Information ("DCI"); and initiate a configured grant timer associated with first HARQ process based on the first uplink grant;

generate a second MAC PDU for a second uplink grant associated with a second HARQ process having overlapping physical uplink shared channel ("PUSCH") resources with the first uplink grant, wherein data of the second MAC PDU has a higher priority than data of the first MAC PDU;

transmit the second MAC PDU according to the second uplink grant and does not transmit the first MAC PDU according to the first uplink grant;

stop the configured grant timer associated with first HARQ process based on not transmitting the first MAC PDU according to the first uplink grant; and autonomously trigger a retransmission of the first MAC PDU for the first HARQ process using next available configured grant resources for the first HARQ process and without receiving network signaling for the retransmission.

2. The UE of claim 1, wherein to autonomously trigger the retransmission of the first MAC PDU for the first HARQ process, the processor is configured to cause the UE to transmit the first MAC PDU on a subsequent uplink configured grant resource of the first uplink grant on the first HARQ process.

3. The UE of claim 1, wherein the second uplink grant is received later than the first uplink grant.

4. The UE of claim 1, wherein the first HARQ process and the second HARQ process correspond to different HARQ processes.

5. A method performed at a user equipment ("UE"), the method comprising:

generating, at the UE, a first medium access control ("MAC") protocol data unit ("PDU") for a first uplink grant associated with an initial transmission for a first hybrid automatic repeat request ("HARQ") process, wherein the first uplink grant is a configured grant, wherein physical uplink shared channel ("PUSCH") resources corresponding to the first uplink grant are not dynamically scheduled, and wherein the PUSCH resources are not granted by Downlink Control Information ("DCI");

initiating a configured grant timer associated with first HARQ process based on the first uplink grant;

generating, at the UE, a second MAC PDU for a second uplink grant associated with a second HARQ process having overlapping physical uplink shared channel ("PUSCH") resources with the first uplink grant, wherein the second uplink grant has a higher priority than the first uplink grant, transmitting, by the UE, the second MAC PDU according to the second uplink grant and not transmitting the first MAC PDU according to the first uplink grant; and stopping, by the UE, the configured grant timer associated with first HARQ process based on not transmitting the first MAC PDU according to the first uplink grant; and autonomously triggering, at the UE, a retransmission of the first MAC PDU for the first HARQ process, wherein autonomously triggering retransmission comprises triggering the retransmission using next available configured grant resources for the first HARQ process and without receiving network signaling for the retransmission.

6. The method of claim 5, wherein autonomously triggering the retransmission of the first MAC PDU for the first HARQ process comprises transmitting the first MAC PDU on a subsequent uplink configured grant resource of the first uplink grant on the first HARQ process.

7. The method of claim 5, wherein the second uplink grant is received later than the first uplink grant.

8. The method of claim 5, wherein the first HARQ process and the second HARQ process correspond to different HARQ processes.

* * * * *